United States Patent
Jain et al.

(10) Patent No.: US 12,489,710 B2
(45) Date of Patent: Dec. 2, 2025

(54) LOAD BALANCING AND NETWORKING POLICY PERFORMANCE BY A PACKET PROCESSING PIPELINE

(71) Applicant: Intel Corporation, Santa Clara, CA (US)

(72) Inventors: Anjali Singhai Jain, Portland, OR (US); Nupur Jain, Saratoga, CA (US); Elazar Cohen, Haifa (IL); John Andrew Fingerhut, Cary, NC (US); Neha Singh, Beaverton, OR (US); Vinoth Kumar Chandra Mohan, San Jose, CA (US); Alana Sweat, Hillsboro, OR (US); Arunkumar Balakrishnan, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 242 days.

(21) Appl. No.: 17/958,349

(22) Filed: Oct. 1, 2022

(65) Prior Publication Data
US 2023/0109396 A1   Apr. 6, 2023

Related U.S. Application Data

(60) Provisional application No. 63/283,135, filed on Nov. 24, 2021.

(51) Int. Cl.
| | | |
|---|---|---|
| *H04L 47/125* | (2022.01) | |
| *H04L 9/40* | (2022.01) | |
| *H04L 47/2483* | (2022.01) | |

(52) U.S. Cl.
CPC ........ *H04L 47/125* (2013.01); *H04L 47/2483* (2013.01); *H04L 63/0236* (2013.01)

(58) Field of Classification Search
CPC  H04L 47/125; H04L 47/2483; H04L 63/0236
See application file for complete search history.

(56) References Cited

U.S. PATENT DOCUMENTS 9,832,269 B2 * 11/2017 Prakash Usgaonkar .....................
H04L 67/1097
10,439,962 B2 * 10/2019 Anand .................... H04L 47/31
(Continued)

FOREIGN PATENT DOCUMENTS

WO    2020236282 A1    11/2020

OTHER PUBLICATIONS

Xin Zhe Khooi et al. "In-Network Applications: Beyond Single Switch Pipelines", 2021 IEEE 7th International Conference on Network Softwarization (NetSoft), 8 pages. (Year: 2021).* Balkan, Ahmet Alp, "Enforcing Network Policies in Kubernetes" https://kubernetes.io/blog/2017/10/enforcing-network-policies-in-kubernetes/, Oct. 30, 2017, 3 pages.
(Continued)

*Primary Examiner* — G. C. Neurauter, Jr.
(74) *Attorney, Agent, or Firm* — Compass IP Law PC

(57) ABSTRACT

Examples described herein relate to a network interface device. In some examples, packet processing circuitry in the network interface device is to receive a first packet and based on the first packet being associated with an identifier for which an entry is not present in a look-up table accessible to the packet processing circuitry, the packet processing circuitry is to provide the identifier for the first packet and an action for the identifier of the first packet and cause the first packet to configure a second look-up-table accessible to the packet processing circuitry with the action for the identifier.

20 Claims, 13 Drawing Sheets

(56) References Cited

U.S. PATENT DOCUMENTS

| | | | |
|---|---|---|---|
| 11,115,328 B2* | 9/2021 | K ........................... | H04L 69/22 |
| 11,470,009 B2* | 10/2022 | Olakangil ............... | H04L 69/22 |
| 11,503,141 B1* | 11/2022 | Peterson ................ | H04L 45/72 |
| 2015/0154257 A1* | 6/2015 | Xiong .................... | H04L 43/20 |
| | | | 707/718 |
| 2021/0409316 A1* | 12/2021 | Seshan ................... | H04L 41/40 |
| 2021/0409317 A1* | 12/2021 | Seshan ................... | H04L 45/38 |
| 2022/0045945 A1* | 2/2022 | Subrahmanya ......... | H04L 45/38 |
| 2022/0052936 A1* | 2/2022 | Chandrasekaran ..... | H04L 41/40 |
| 2022/0166666 A1* | 5/2022 | Jain ....................... | H04L 41/0663 |
| 2022/0210220 A1* | 6/2022 | Shivanna ............... | H04L 67/1008 |
| 2023/0091195 A1* | 3/2023 | Zhang ................ | H04L 49/1546 |
| | | | 370/392 |
| 2024/0396844 A1* | 11/2024 | Shrivastava ............ | H04L 45/74 |

OTHER PUBLICATIONS

Bossart, Pat et al., "P4: Programming Protocol-Independent Packet Processors", ACM SIGCOMM Computer Communication Review, vol. 44, No. 3, Jul. 2014, 8 pages.

Krazit, Tom, "Intel's new companion chip for cloud providers has arm inside", https://www.protocol.com/enterprise/intel-mount-evans-arm, Aug. 19, 2021, 4 pages.

Extended European Search Report for Patent Application No. 22201704.8, Mailed Apr. 17, 2023, 14 pages.

Osinski Tomasz et al: "A Runtime-Enabled P4 Extension to the Open vSwitch Packet Processing Pipeline", IEEE Transactions on Network and Service Management, IEEE, USA, vol. 18, No. 3, Feb. 1, 2021 (Feb. 1, 2021), pp. 2832-2845, 14 pages.

\* cited by examiner

LOAD BALANCING AND NETWORKING POLICY PERFORMANCE BY A PACKET PROCESSING PIPELINE

RELATED APPLICATION

This application claims priority to U.S. Provisional Application No. 63/283,135, filed Nov. 24, 2021. The entire contents of that application are incorporated by reference in its entirety.

BACKGROUND

Networking and security are utilized in data center deployments and involve topology aware network policies, service load balancing, and dynamic routing. Some central processing unit (CPU) resources are used for storage and network provisioning operations. However, some data center customers prefer to utilize CPU resources for business logic and tenant hosting. In a datacenter, some network interface devices include programmable data planes that are configurable by a control plane. The control plane can configure the programmable data planes with certain rules of operation so that the network interface device can independently perform packet processing operations.

DETAILED DESCRIPTION

At least to alleviate use of a CPU for operations related to network provisioning and storage interface provisioning, some examples offload network policies and load balancing rules to a packet processing pipeline circuitry of a network interface device. A first packet of a flow not previously received by the packet processing pipeline circuitry can be processed through a network policy table to identify related rules to apply for packets of the flow. The first packet can be recirculated through the packet processing pipeline circuitry to cause configuration of the packet processing pipeline circuitry to apply the related rules for the first packet of the flow and subsequent packets of the flow.

The first packet of a new flow can be processed using network policy tables so that packet pipeline processing circuitry can determine whether it should be allowed (clearance) or not to be processed (rejection) by packet pipeline processing circuitry. The first packet of the new flow can be processed by a load balancer to determine which end point is to process packets of the new flow. When or after the load balancer has determined the end point that is to process packets of the new flow, packet processing circuitry can modify the packets of the new flow using network address translation (NAT) or other techniques to direct the packets to the allocated end point and also store the mapping for this new flow in the flow cache table so that rest of the packets of this flow can be processed by a fast path and are not processed using the network policy tables and load balancer. Other packets of the new flow can be processed by a fast path based on clearance of the new flow to be processed by packet pipeline processing circuitry or not be permitted to be processed by packet processing pipeline circuitry based on rejection of the flow.

Packet processing pipeline circuitry can be configured to perform packet forwarding for network and storage applications, such as cloud native deployments inside of a host node for east-west traffic (e.g., data packets sent server-to-server within a data center). Packet processing pipeline circuitry can support a variety of legacy and advanced use-cases extending across Artificial Intelligence (AI), cloud, Network Function Virtualization (NFV), Edge, among others. Application of a Kubernetes service and policy flow can be offloaded to the packet processing pipeline circuitry. Packet processing pipeline circuitry can perform load balancing of traffic to Kubernetes or other services.

Packet processing pipeline circuitry can perform load balancing, security, and apply network policies for distributed runtime (e.g., microservices, virtual machines, service mesh, containers, service function chains). Network policies can be provided by a tenant, infrastructure provider, service provider used to select entity to service a request.

Figure 1:
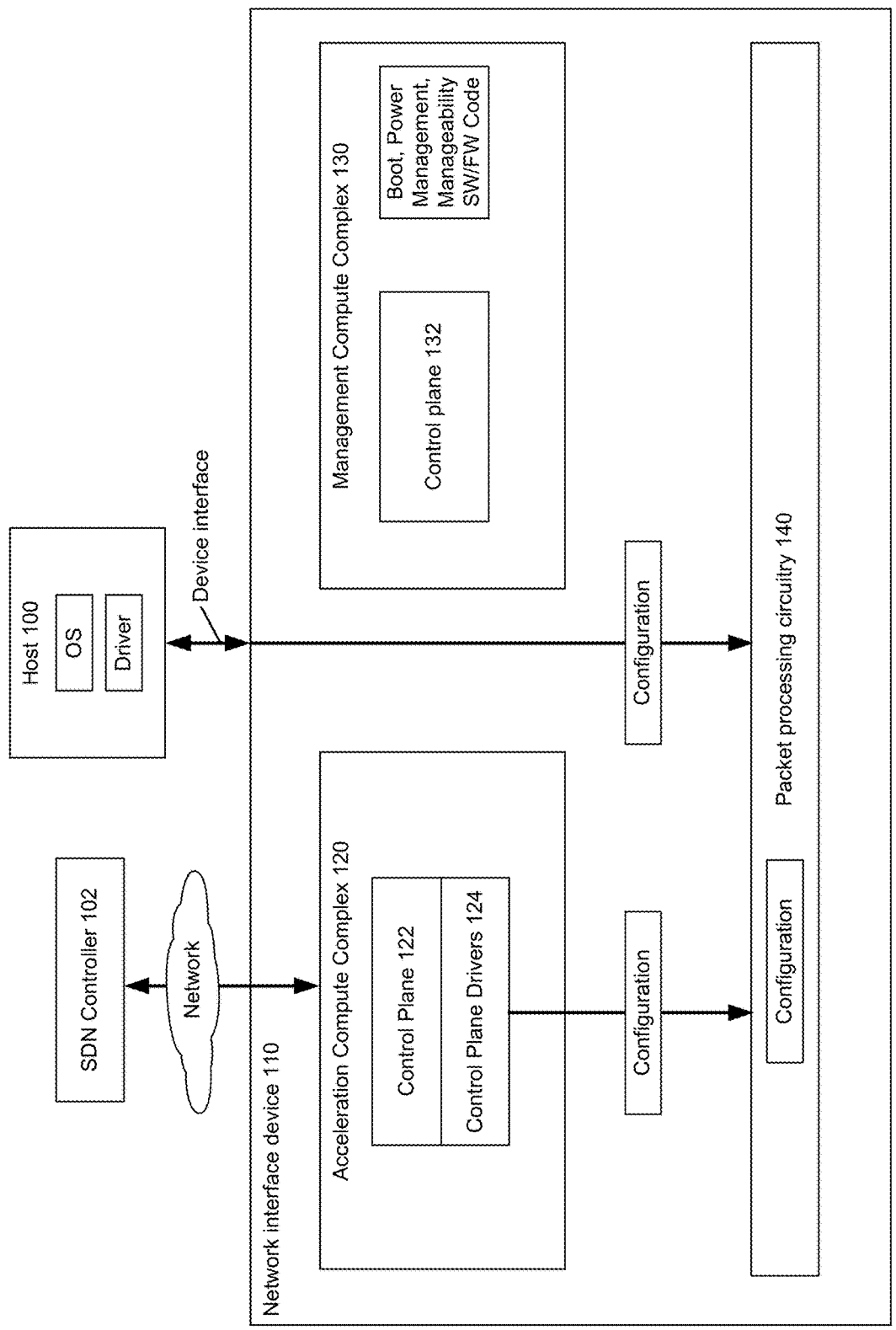
FIG. 1 depicts an example system.

FIG. 1 depicts an example system. Host 100 can include one or more processors, one or more memory devices, one or more device interfaces, as well as other circuitry and software described at least with respect to one or more of FIGS. 9-12. Processors of host 100 can execute software such as applications (e.g., microservices, virtual machine (VMs), microVMs, containers, processes, threads, or other virtualized execution environments), operating system (OS), and one or more device drivers. For example, an application executing on host 100 can utilize network interface device 110 to receive or transmit packet traffic. An OS or device driver can configure network interface device 110 to utilize one or more control planes to communicate with software defined networking (SDN) controller 102 via a network to configure operation of the one or more control planes.

Network interface device 110 can be implemented as one or more of: a microprocessor, processor, accelerator, field programmable gate array (FPGA), application specific integrated circuit (ASIC) or circuitry or software described at least with respect to one or more of FIGS. 9-12. Network interface device 110 can include multiple compute complexes, such as an Acceleration Compute Complex (ACC) 120 and Management Compute Complex (MCC) 130, as well as controller 150, packet processing circuitry 140, and network interface technologies for communication with other devices via a network.

Figure 7:
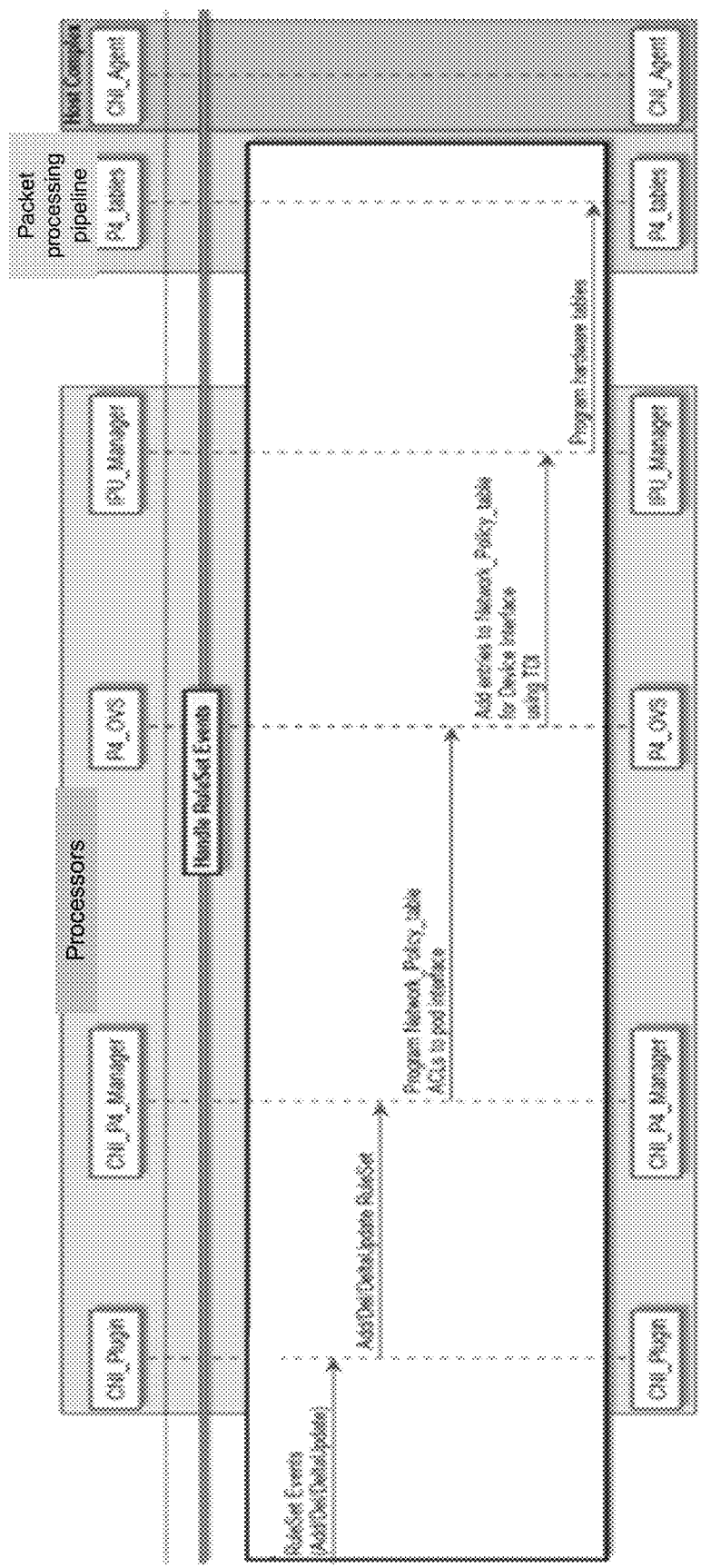
FIG. 7 depicts an example of adding, updating, or removing rules to implement a security policy.
Figure 8:
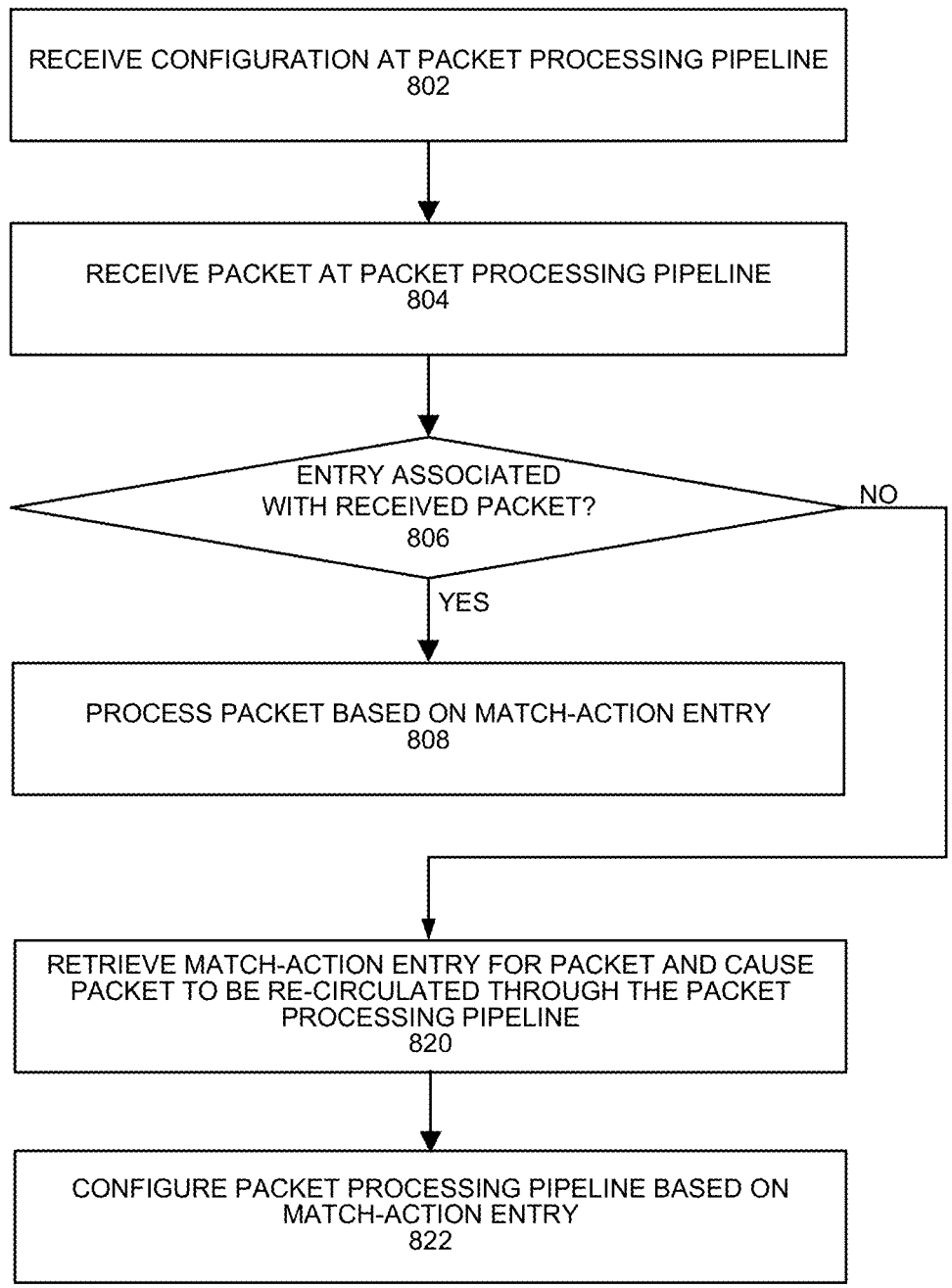
FIG. 8 depicts an example process.
Figure 9:
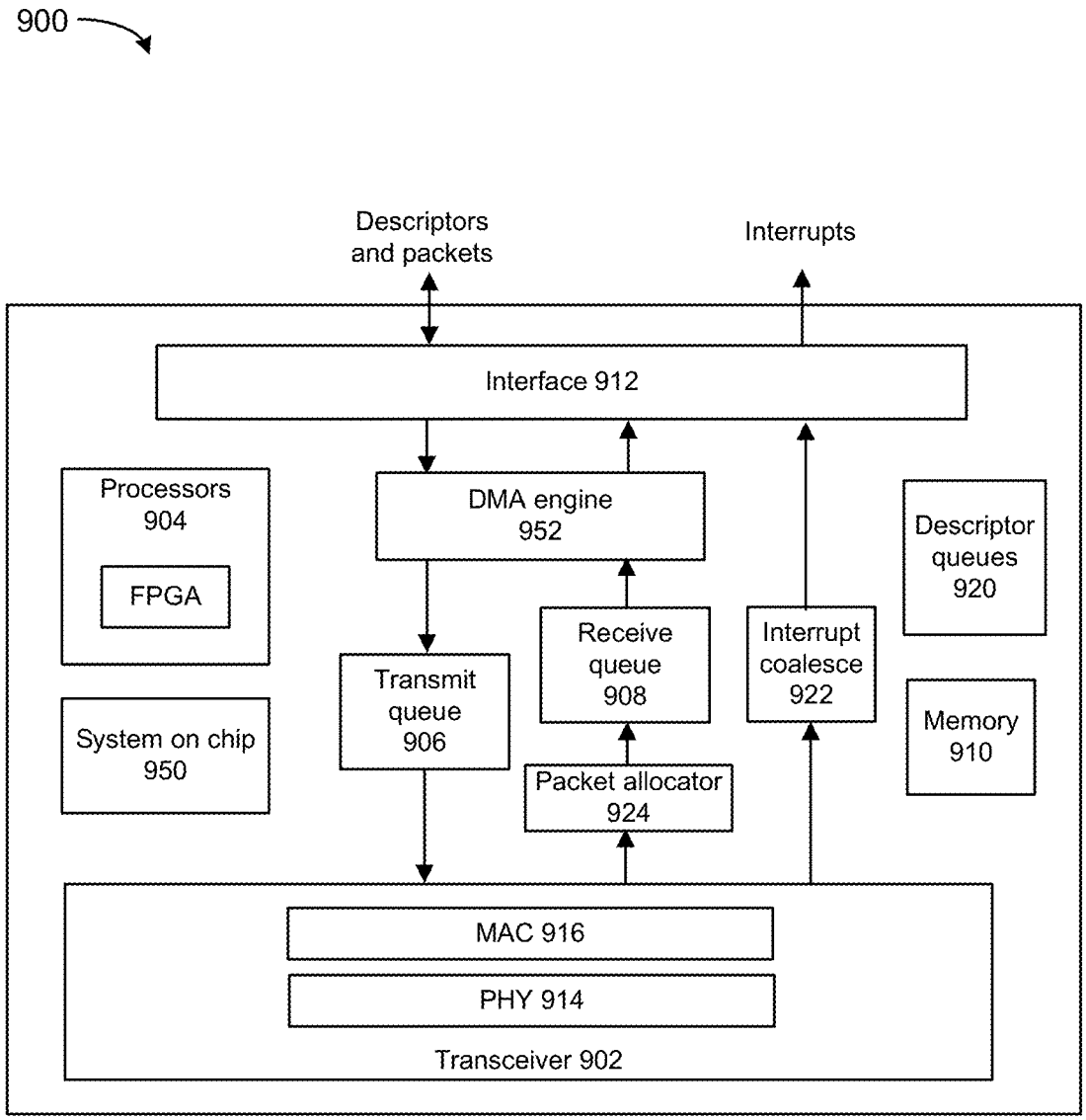
FIG. 9 depicts an example network interface device.

ACC 120 can be implemented as one or more of: a microprocessor, processor, accelerator, field programmable gate array (FPGA), application specific integrated circuit (ASIC) or circuitry described at least with respect to FIGS. 7-9. Similarly, MCC 130 can be implemented as one or more of: a microprocessor, processor, accelerator, field programmable gate array (FPGA), application specific integrated circuit (ASIC) or circuitry described at least with respect to one or more of FIGS. 9-12. In some examples, ACC 120 and MCC 130 can be implemented as different cores in a CPU, different cores in different CPUs, different processors in a same integrated circuit, or different processors in different integrated circuits.

Subject to approvals or denials of configurations by controller 150, packet processing circuitry 140 can process packets as directed or configured by one or more control planes executed by multiple compute complexes. In some examples, ACC 120 and MCC 130 can execute respective control planes 122 and 132 that request configuration of packet processing circuitry 140.

In some examples, SDN controller 102 can provide rules that control plane 122 executed by ACC 120 is to utilize to configure packet processing circuitry 140. For example, control plane 122 executed by ACC 120 can program table rules (e.g., header field match and corresponding action) applied by packet processing pipeline circuitry 140 based on change in policy and changes in VMs, containers, microservices, applications, or other processes.

In some examples, SDN controller 102 can configure packet processing circuitry 140 with match-action entries for flows yet-to-be received by packet processing circuitry 140, as described herein. A packet of a first time received flow (e.g., new flow) can be associated with one or more match-action entries, and re-circulated through packet processing circuitry 140 for configuration by the one or more match-action entries, as described herein.

Control plane 122 executed by ACC 120 can be configured to provide network policy rules into a table to configure operation of packet processing pipeline 140. For example, the ACC-executed control plane application 122 can configure rule tables applied by packet processing pipeline circuitry 140 with rules to define a traffic destination based on packet type, flow identifier, and/or content. Control plane 122 executed by ACC 120 can program table rules (e.g., match-action) into memory accessible to packet processing pipeline circuitry 140 based on change in policy and changes in VMs. For example, control plane 122 executed by ACC 120 can configure packet processing pipeline circuitry 140 as to which VM is to receive traffic and what kind of traffic a VM can transmit. In some examples, packet processing pipeline circuitry 140 can execute a virtual switch such as vSwitch or Open vSwitch that provides communications between virtual machines executed by host 100 and network interface device 110.

MCC 130 can execute a host management control plane, global resource manager, and perform configuration of hardware registers. Control plane 132 executed by MCC 130 can perform provisioning and configuration of packet processing circuitry 140. For example, a VM executing on host 100 can utilize network interface device 110 to receive, transmit, or process packet traffic. MCC 130 can execute boot, power, management, and manageability software (SW) or firmware (FW) code to boot and initialize the packet processing device 110, manage the device power consumption, provide connectivity to Baseboard Management Controller (BMC), and other operations.

Host 100 and ACC 120 (or other devices (e.g., MCC 130 and SDN controller 102)) can execute control planes that request configuration of packet processing circuitry 140. One or both of control planes executed by host 100 and ACC 120 can define traffic routing table content and network topology applied by packet processing circuitry 140 to select a path of a packet in a network to a next hop or to a destination network-connected device. Configuration of packet processing circuitry 140 can include configuration of table rules such as match-action entries for particular flow or flow aggregate identifiers. Host 100 and ACC 120 can provide configuration by at least one packet or by writing to a queue associated with a source control plane. At least one packet can include a requester identifier (ID) that identifies a control plane that requests a configuration. A queue can be associated with a particular requester (e.g., control plane executed by host 100 or ACC 120) so that packet processing circuitry 140 identifies a requester's configuration by a queue that stores the requester's configuration.

Packet processing circuitry 140 can be implemented using one or more of: application specific integrated circuit (ASIC), field programmable gate array (FPGA), processors executing software, or other circuitry. Various examples of packet processing pipeline circuitry 140 are described herein. Control plane 122 and a control plane executed by host 100 can configure packet processing pipeline circuitry 140 or other processors to perform operations related to issuances of non-volatile memory express (NVMe) reads or writes, issuances of Non-volatile Memory Express over Fabrics (NVMe-oF™) reads or writes, lookaside crypto Engine (LCE) (e.g., compression or decompression), Address Translation Engine (ATE) (e.g., input output memory management unit (IOMMU) to provide virtual-to-physical address translation), local area network (LAN) packet transmissions or receipts, compression/decompression, encryption/decryption, configuration as a storage node, configuration as a tenant hosting node, configuration as a compute node, provide multiple different types of services between different Peripheral Component Interconnect Express (PCIe) end points, or other accelerated operations. For example, a control configuration can be applied to high-frequency population use-cases (e.g., connection tracking for disaggregated firewall deployments).

A packet may be used herein to refer to various formatted collections of bits that may be sent across a network, such as Ethernet frames, IP packets, TCP segments, UDP datagrams, etc. Also, as used in this document, references to L2, L3, L4, and L7 layers (layer 2, layer 3, layer 4, and layer 7) are references respectively to the second data link layer, the third network layer, the fourth transport layer, and the seventh application layer of the OSI (Open System Interconnection) layer model.

A flow can include a sequence of packets being transferred between two endpoints, generally representing a single session using a known protocol. Accordingly, a flow can be identified by a set of defined tuples and, for routing purpose, a flow is identified by the two tuples that identify the endpoints, e.g., the source and destination addresses. For content-based services (e.g., load balancer, firewall, intrusion detection system, etc.), flows can be discriminated at a finer granularity by using N-tuples (e.g., source address, destination address, IP protocol, transport layer source port, and destination port), where N-tuple can refer to one or more of: source address, destination address, IP protocol, transport layer source port, and destination port. A packet in a flow is expected to have the same set of tuples in the packet header. A packet flow to be controlled can be identified by a combination of tuples (e.g., Ethernet type field, source and/or destination IP address, source and/or destination User Datagram Protocol (UDP) ports, source/destination TCP ports, or any other header field) and a unique source and destination queue pair (QP) number or identifier.

Figure 2A:
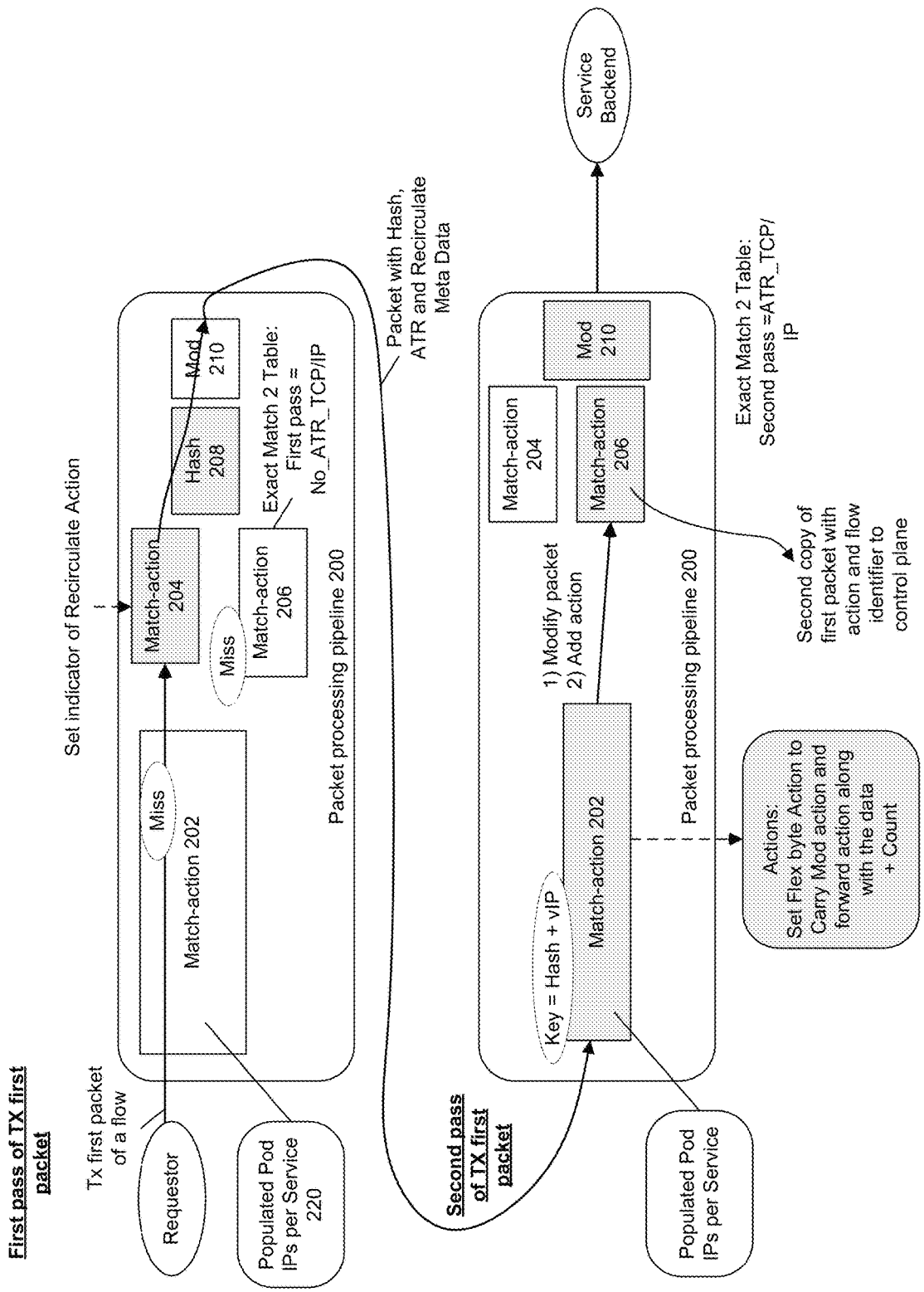
FIGS. 2A-2B depict an example system and example operations.
Figure 2B:
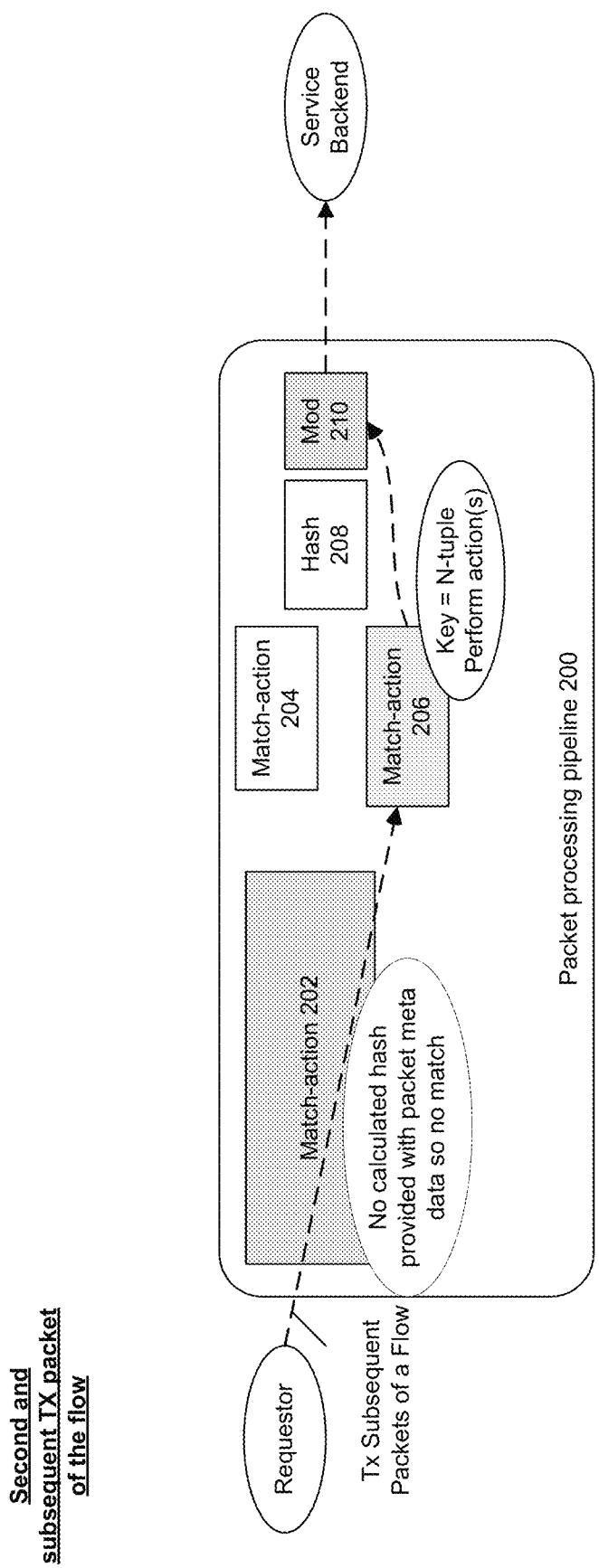
Figure 3:
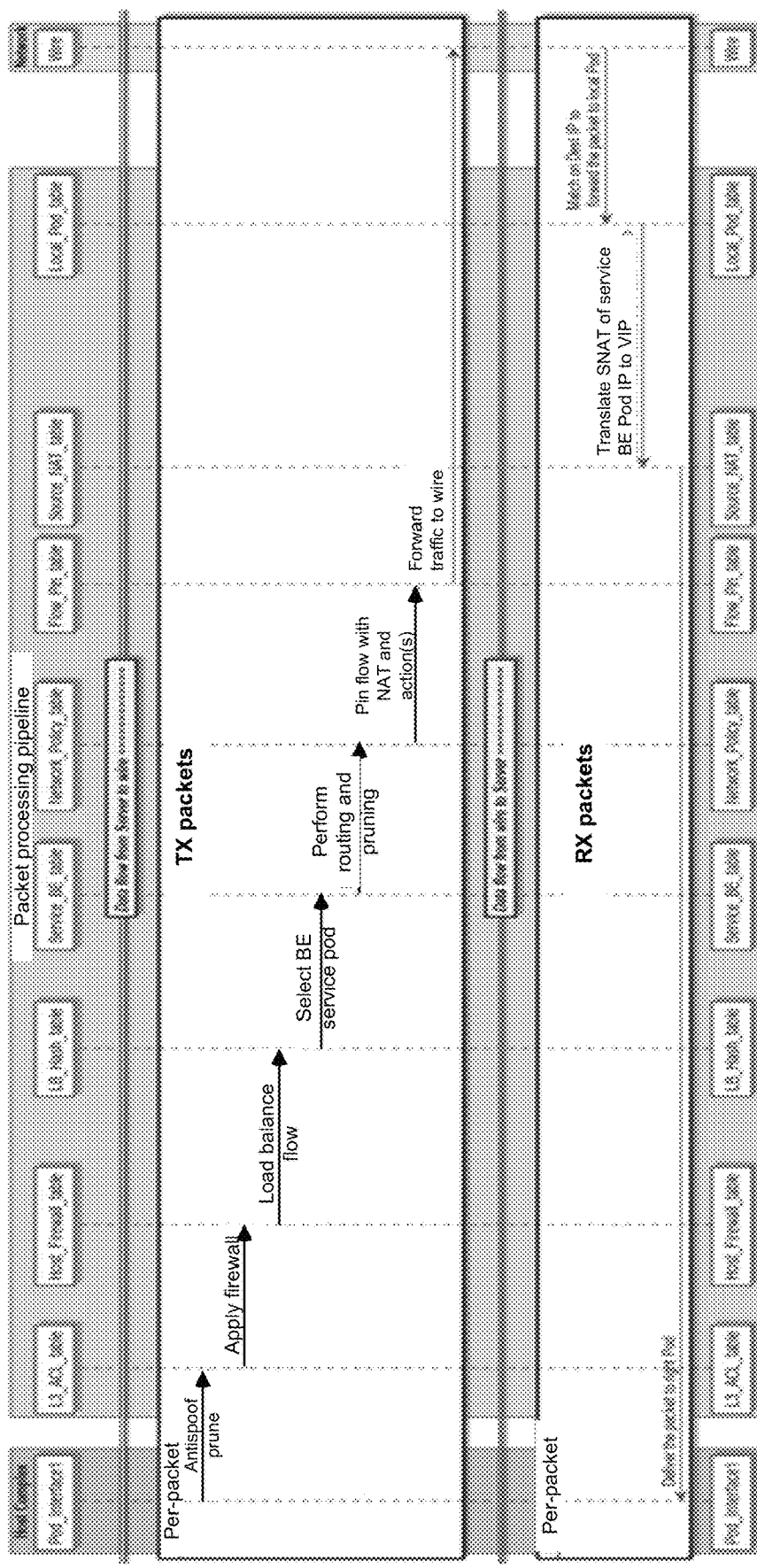
FIG. 3 depicts an example flow of configuration of a packet processing pipeline for load-balancing of service or policy application.

FIGS. 2A, 2B, and 3 describe examples of data flow operations. FIG. 2A depicts an example system and operation. An SDN controller or other controller or orchestrator can configure match-action circuitry 202 with entries 220 of hash values, associated virtual Internet Protocol (vIP) addresses, as well as actual destination Internet Protocol (IP) addresses of target services or devices, and associated actions to perform on packets associated with the hash value, as described herein. A hash value can be a hash value calculated based on an N-tuple and provided by hash calculator 208, as described herein. Match-action circuitry 202 can apply an exact match table to determine an action to perform for a matched hash value. For example, a hash value can represent a flow and match-action circuitry 202 can allocate a vIP address to the hash value. A vIP address can represent a recipient service or device. If a new flow is received by packet processing pipeline 200, match-action circuitry 202 can assign a hash value and vIP endpoint and associated actions to the new flow by populating match-action circuitry 206 with one or more actions for a match of an N-tuple of the packet. Based on lookup of the N-tuple and one or more actions from match-action 206, an action to perform on the packet can be performed or identified by match-action circuitry 206. Non-limiting examples of actions include: modify vIP to be actual destination IP address of a target device (including device or service), perform a forwarding action, send a copy of the modified packet to a control plane, or others.

For example, a destination service (e.g., Kubernetes pod, VM, microservice, application, or process) or device can include a Kubernetes service (pod) executed by a server or network interface device. The SDN controller or other controller or orchestrator can configure entries in match-action circuitry 202 to direct and limit communications between services permitted to communicate with one another.

During runtime, SDN controller or other controller or orchestrator can configure match-action circuitry 202 with new entries. Accordingly, packets of new flows can be directed to service or device destinations without changing service or device destinations of existing flows. Changing service or device destinations of existing flows can cause a connection to be reset as the service provided by an endpoint may be stateful and can inhibit load balancing where new end points are added to perform an extra load without moving the old load from the existing endpoints as they are capable of handling the existing load.

A requester can cause transmission of a packet (Tx first packet of flow) to a network interface device. For example, a TCP SYN flag can identify a first packet and start of a new flow. A requester can include a service (e.g., Kubernetes pod, VM, microservice, application, or process) or device. Packet processing pipeline 200 can process packets of a flow. Match-action circuitry 202 can determine whether a received packet is associated with a previously identified or new flow based on matches of flow identifiers in packets. For a first packet of a flow for which an associated hash identifier is not stored in match-action 202, match-action 202 incurs a miss. In some examples, in a TCP packet, a SYN flag can indicate to match-action 202 that the packet is part of a new flow.

Match-action circuitry 204 can process the first packet and can set an indicator to recirculate the first packet and can set a flag to trigger a flow rule and action addition in a second pass of the first packet of the flow through at least match-action 202 and match-action 206 of packet processing pipeline 200, described later. Match-action 204 can perform a wildcard match (WCM) operation to match the packet with an action to include an indicator to recirculate the first packet through packet processing pipeline 200 and can set a flag to trigger a flow rule and action addition in a second pass of the first packet of the flow through at least match-action 202 and match-action 206 of packet processing pipeline 200. For example, the indicator to recirculate the first packet through packet processing pipeline 200 (e.g., Application Targeted Routing (ATR) bit(s)) can be set in metadata associated with the first packet.

Recirculation of the packet to create a flow-cache can reuse generic hardware circuitry instead of having to design multiple copies of such blocks. Recirculation can allow for a policy (e.g., Kubernetes) to be as complex as needed without having to predict upfront how many levels of policies need to be applied for a given data plane.

Match-action 204 can write the indicator and the flag in metadata associated with the first packet. Metadata associated with the first packet can be stored in memory. Metadata can be accessible through a bus or from a memory device. Metadata can be valid for a single packet of a particular flow such as a first packet of a flow not previously received by packet processing pipeline 200.

Match-action circuitry 206 can process the first packet, at least partially in parallel, with match-action circuitry 204 processing the first packet. Match-action circuitry 206 can determine whether there is an action associated an N-tuple of the first packet based on an exact match operation. As the packet is the first packet of a flow, there is no pre-existing entry in a pinned flow table associated with match-action circuitry 206.

Hash circuitry 208 can perform a hash operation on the first packet to generate a hash value based on the N-tuple value of the first packet. The hash value can be placed in meta data associated with the first packet. Modification circuitry 210 can perform no action on the first packet as no action is identified by match-action circuitry 202, match-action circuitry 204, or match-action circuitry 206.

Match-action circuitry 202, 204, or 206 can perform flow identification based on one or more of: exact match, small exact match (SEM), large exact match (LEM), wildcard match (WCM), longest prefix match (LPM), a hash match, port range match, or others.

In a second pass of the first packet through packet processing pipeline 200, during recirculation of the first packet through packet processing pipeline 200 with metadata generated during the first pass, an example processing of the first packet by packet processing pipeline 200 can be as follows. Match-action 202 can perform lookup of an entry based on a key of the hash value from the meta data of the recirculated packet and vIP in a packet header of the recirculated packet. A mask can be used to limit a size of an entry in a hash table accessed by match-action 202 by limiting number of bits. If a matched entry is not found, an error message can be provided to a host server or control plane executing in the network interface device. Match-action 202 can request modification circuitry 210 to modify the packet to replace vIP of the packet with an actual destination IP address determined from the matched entry. Match-action 202 can cause match-action 206 to add a rule with one or more actions in its lookup table. Match-action 202 can write one or more actions to perform based on a match of the N-tuple of the first packet. For example, the rule to be performed by match-action 202 can associate the N-tuple of the first packet with one or more actions written in the metadata. Example actions include: select egress port, modify packet to replace vIP with a particular actual destination IP address, count of packets (to load balance work performed by destination services or devices), a counter of bytes or packets of a flow that were sent to a particular destination, mirror operation, or others.

When a rule entry is added for performance by match-action 206, match-action 206 can cause the packet to be mirrored and forwarded through a port to inform a control plane that a flow rule and corresponding action(s) were added in match-action 206 for N-tuple.

FIG. 2B depicts an example system and operation for subsequent packets of the flow. As no hash value calculation is provided in metadata for subsequent packets in the same flow, match-action 202 does not identify an entry to use to update match-action 206. Match-action 206 can identify an entry for an N-tuple of the subsequent packets and perform associated actions or indicate associated actions for another circuitry to perform, such as modify, forward, count, or others. After processing of the packets of the flow, the packets can be transmitted to a destination (e.g., service backend). For example, a service backend can receive and process packets of the flow. Service backend can include a Kubernetes pod.

At least in a Kubernetes environment, packets from a source pod can be addressed to a vIP address of a destination service that is advertised in a cluster. A path for a first sync Transmission Control Protocol (TCP) packet from a source pod can include a packet addressed to a vIP address and VIP media access control (MAC) address of a destination service. As the packet is the first packet of a flow, there is no pre-existing entry in pinned flow table match-action 206. An Application Targeted Routing (ATR) bit for the packet is set to 0 in a descriptor or metadata, which indicates to re-circulate the packet. Hash calculator 208 can calculate a hash on selected header fields of the packet and store the hash in the descriptor or metadata. In some examples, if TCP SYN flag indicates a new flow is transmitted, the packet is marked for a packet processing pipeline to re-circulate through pipeline and ATR bit is set to 1.

A second pass of the first packet (e.g., Sync TCP) with packet metadata having ATR bit flag value of 1 through the packet processing pipeline can be processed as follows. Backend pod entries for VIP values can be updated a priori. At (1), exact match is performed on Destination IP (VIP)+ Destination port (L4 port) of the packet, and one or more hash bits to determine an entry to add to a look up table for utilization by match-action 206. A number of hash bits to match-on can be adjusted to scale to the number of endpoints for a service in a cluster. An action of the match-action entry can be to pick one of multiple Pod endpoints that are being addressed using the Destination VIP of the packet from lookup table entries. At (3), the destination IP address and Media Access Control (MAC) address can be picked to overwrite the packet destination VIP in the packet. A Destination Network Address Translation (DNAT) or firewall action can adjust the packet destination to be a target pod endpoint. If the target Pod endpoint resides on another node, then a routing table can be used to process the packet and neighbor table and routing interface table can be used to select a right destination MAC and egress port. At (4), lookup is performed in a pinned flow table and based on a lookup miss, a new flow entry can be added to this table (add_on_miss) from the entry to add to a look up table for utilization by match-action 206. The added flow entry can indicate cumulative or more actions or transformations to perform on packets of the flow direct to a destination pod endpoint. The packet processing pipeline can replace destination VIP of packets of the flow with destination IP and MAC addresses.

Return TCP traffic from the destination endpoint can be processed as follows. At (1), the endpoint sends the response to the source pod, with a source IP address that is a pod endpoint destination IP address. At (2), an exact match on the flow in a source NAT table for reverse-DNAT where a pod endpoint destination IP address-to-VIP pair exists. The packet processing pipeline can replace the destination IP address and/or destination MAC address with the destination VIP address that was overwritten at (3), earlier.

An example of network policy configuration is described next. Access Control Lists (ACL) can configure a packet processing pipeline to implement Network Policies which specify how a connection can happen between the various network entities. The entities that a Pod can communicate with are identified through one or more of the following identifiers: (a) other application Pods that can connect to this Pod for service (note a pod cannot block access to itself); (b) the port this Pod allows connection on or does not allow connection; (c) Namespaces that are allowed or not allowed; or (d) permitted or non-permitted IP blocks or subnet ranges to permit traffic to node where Pod is running as allowed.

When converted to IP addresses and ports, these policies can translate to IP Classless Inter Domain Routing (CIDR) ranges or IP Address, ports, or port ranges. These policies can apply in both ingress and egress directions.

Receipt of TCP FIN or RST packet can identify that a flow has terminated. Packet processing pipeline 200 can remove a flow cache rule for a terminated flow based at least on receipt of TCP FIN or RST.

A flow cache can be allocated for multitudes of flows and packet processing pipeline 200 can maintains a multi-level cache scheme to keep active flows in a first level and the rest of the flows in a second level of cache. When a flow becomes active, one or more rules for the flow can be copied from the second level cache to the first level cache and replace a rule that is expired (e.g., time to live (TTL) expired) or a rule that is least recently used (LRU). The rule that is replaced can be evicted to the second level cache or other storage.

FIG. 3 depicts an example flow of configuration of a packet processing pipeline for load-balancing of service or policy application. Host complex can include a host computer or server that can execute a requester service or device. Pod_Interface1 can represent a requester or pod. Pod_Interface1 can configure L3_ACL_table to perform anti-spoof pruning in order to control which requesters can configure the packet processing pipeline, such as by source IP addresses. L3_ACL_table can be performed by a packet processing pipeline and represent match-action 204, in some examples. L3_ACL_table can request Host_Firewall_table to block certain destination IP addresses or destination ports. Host_Firewall_table can be performed by a packet processing pipeline and represent match-action 202, in some examples. Host_Firewall_table can request LB_Hash_table to provide a hash value to subsequently select destination IP address for a packet and load balance processing of flows. LB_Hash_table can be performed by a packet processing pipeline and represent hash calculation 208, in some examples.

LB_Hash_table can request Service_BE_table to select a backend (BE) service pod to select a backend destination IP address among multiple backend destination IP address. LB_Hash_table can be performed by a packet processing pipeline and represent hash calculation 208, in some examples. Service_BE_table can request Network_Policy_table to select a backend (BE) service pod to perform routing and pruning to select a back end service or device to process packets of a flow associated with a hash value. Service_BE_table can be performed by a packet processing pipeline and can be associated with a particular service, in some examples. Multiple Service BE table can be available for different services.

Network_Policy_table can request Flow_Pin_table to associate a flow with a NAT and actions such as one or more of: forward/drop, count, or others. Flow_Pin_table can be performed by a packet processing pipeline and can represent match-action 206 and modification circuitry 210, in some examples. Flow_Pin_table can cause the vIP of the packet to be replaced with a destination IP address of the selected backend service. Flow_Pin_table can cause the packet to be forwarded to a destination IP and other addresses associated with the selected back end service. A new connection from a client towards a service in a datacenter cluster is then subjected to pipeline rules for selection (load balancing) of an endpoint from a pool of endpoints that service this connection in accordance with user defined networking policies. A connection may be denied or allowed by the networking policy.

A response in one or more packets can be received from the selected back end service. Local_Pod_table can receive the one or more packets and determine if the response was sent to the correct destination IP. Local_Pod_table can be performed by a packet processing pipeline, in some examples.

Local_Pod_table can request Source_NAT_table to determine a requester or pod to which to route the one or more packets with the response. Source_NAT_table can replace a source address in the one or more packets with a vIP that was replaced with a destination IP address. Source_NAT_table can cause the one or more packets to be provided to the requester service or device. Source_NAT_table can be performed by a packet processing pipeline, in some examples.

In some examples, the example of FIG. 3 can be used in a Kubernetes proxy. A Kubernetes proxy (kube-proxy) can execute on a node and maintain network rules that allow network communication to pods from network sessions inside or outside of a cluster. A Kubernetes cluster can include one or more nodes that execute containerized applications. In some examples, a Kubernetes pod can include one or more containers with shared storage and network resources and a specification for how to execute the containers. Examples are not limited to Kubernetes and can apply to any distributed load balancer, service model, or distributed runtime environment, such as Docker, Amazon Web Services (AWS) Fargate, AWS Lambda, Azure Container Instances (ACI), Openshift Container Platform, or others.

An example manner of configuring load balancing is described next. In a Kubernetes deployment, pods are created and destroyed to keep the running state and configured state the same. Pods are non-permanent resources as they are added and removed based on load, service replica count changes or general node or pod level failures. A pod can be assigned its own Internet Protocol (IP) address. A single Domain Name System (DNS) name can used for a set of service pods to load-balance across pods. A DNS entry can be linked to a Virtual IP (VIP) address, in some examples.

Figure 4:
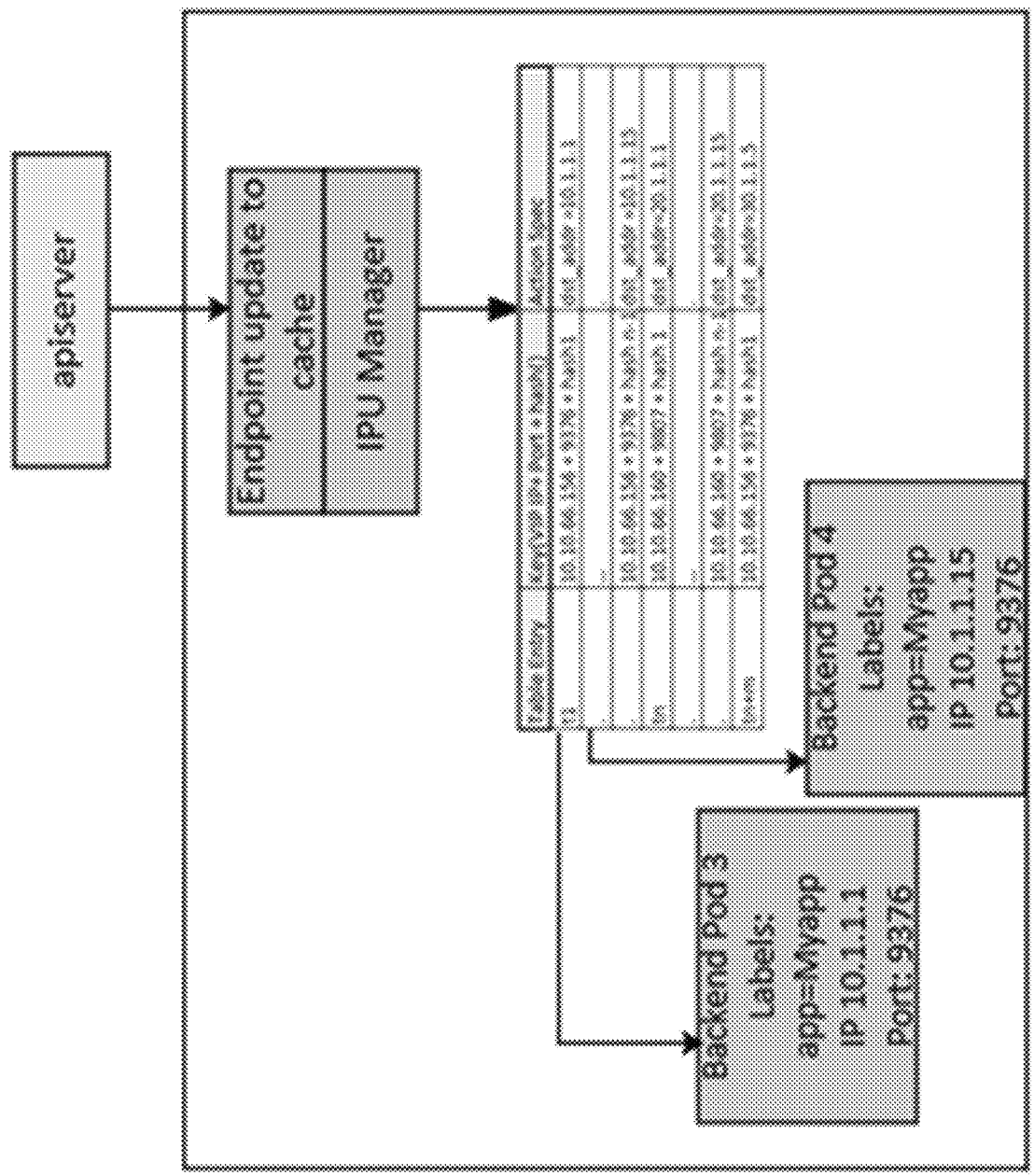
FIG. 4 depicts an example of a control plane configuring a node.

FIGS. 4-7 can describe examples of configuration operations. FIG. 4 depicts an example of a control plane configuring a node. The nodes can be part of a Kubernetes cluster. For example, a control plane can include an SDN controller. A node can include a computing system that executes on one or more Kubernetes pods. A control plane, represented as apiserver, can configure an endpoint node with match-action rules. Match-action rules can include entries that associate one or more actions with hash values. For example, the match-action rules can configure match-action circuitry 202. In some examples, hash values can be provided in metadata for a packet or within a packet header or payload. Entries can indicate one or more actions to configure a packet processing pipeline to perform based on a packet having a particular vIP address. Various example actions are described herein.

Figure 5:
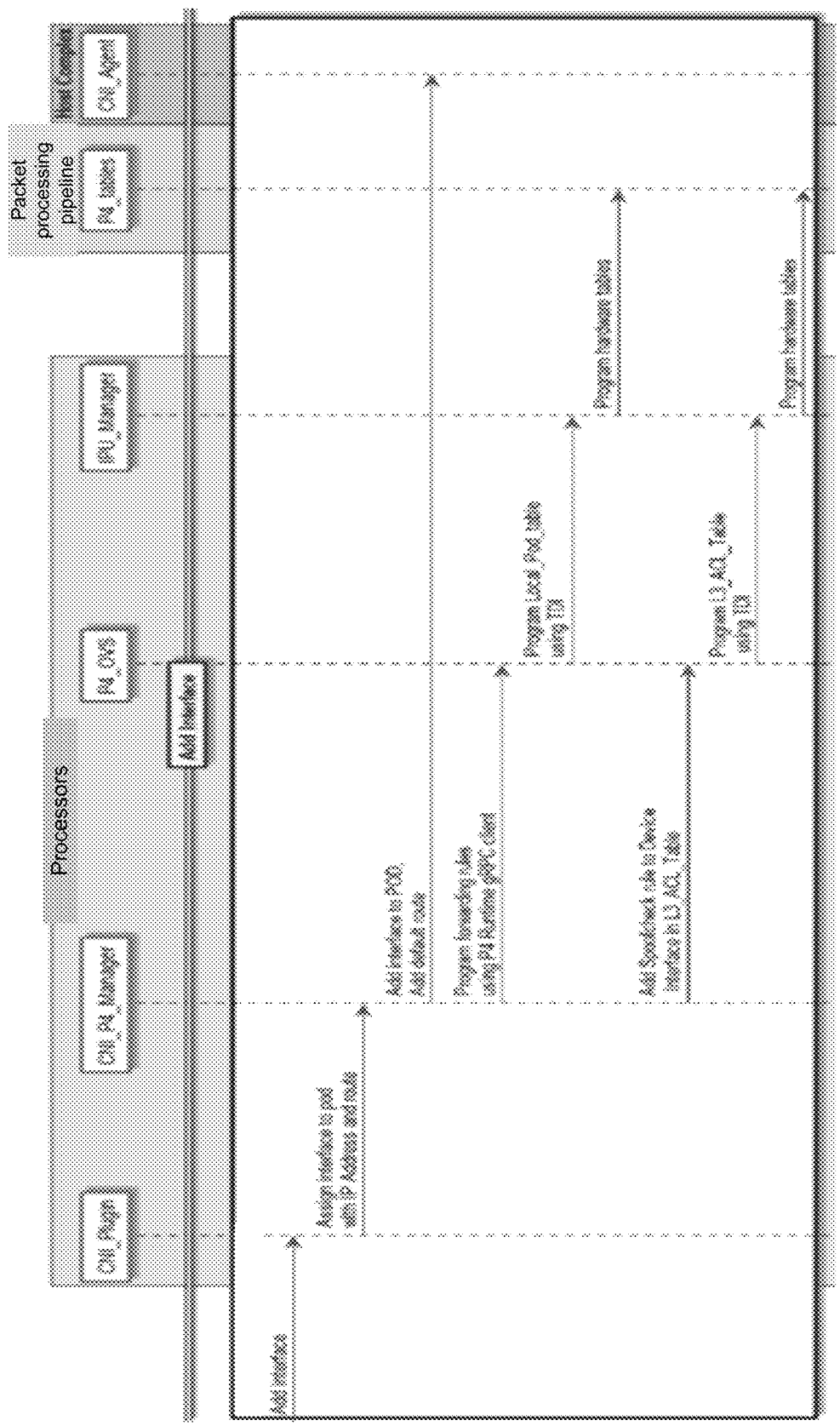
FIG. 5 depicts an example to add an interface.

FIG. 5 depicts an example to add an interface. A control plane can include container network interface (CNI) Plugin, CNI_P4_Manager, P4_OVS, and IPU_Manager. CNI Plugin, CNI_P4_Manager, P4_OVS, and IPU_Manager can execute on processors of a network interface device such as ACC 120. A virtual switch controller (e.g., Open vSwitch) (not shown) can request adding a network interface for an added target service. CNI_Plugin can add a network interface for an added target service (e.g., pod) in coordination with CNI_Agent executed by a host processor.

In Kubernetes, a device plugin can create device interfaces (virtual ports) supported by the host. A pool of interfaces can be discovered by IPU_Manager through device manager notifications. For a service add request, IPU_Manager can allocate an interface from the pool and assign the interface to a Pod namespace using CNI_Agent.

The computing environment for datacenter applications has been changing constantly, creating the need for ever-expanding pools of resources for evolving software models such as containers and microservices. Such containerized workloads can utilize light weight interfaces that scale and provide isolation domains in datacenters. To address these challenges, at least the following device interfaces can be utilized: Intel® Scalable Input-Output Virtualization (SIOV) and Container Device Queues (CDQ).

SIOV-based Assignable Device Interfaces (ADIs) can provide an ability to read or write by Direct Memory Accesses (DMAs) directly from user space into the device with memory domain isolation and can be used as a message-based socket interface into the network interface device. CDQ is a port splitting technique that is being popularized by the sub-dev architecture in Linux® kernel and can be used for device resource isolation for achieving Quality of Service (QoS) per Container Interface.

CNI_P4_Manager can receive requests to configure match-action tables from the CNI_Plugin that requests match-action entries to be added to lookup tables of a packet processing pipeline for forwarding rules for packets to be sent to the added target service. P4_OVS can receive P4 Runtime requests from CNI_P3_Manager and invoke Table Driven Interface (TDI) API to configure tables with a P4 compatible version of entries from the controller. IPU_Manager can program tables of packet processing pipeline (e.g., P4_tables) with P4 entries from controller.

In some examples, CNI_P4_Manager can request P4_OVS to add spoof check rules to lookup tables of the packet processing pipeline to limit requesters of packet transmissions to the added service to a list of one or more permitted requesters. A requester can be identified based on source IP or source MAC address.

A controller or control plane can monitor service endpoint workload to determine whether to remove a service endpoint, add another service endpoint, or an amount of packet traffic that can be routed to a service endpoint. Load balancing of endpoint services in the cloud can provide for handling traffic spikes without a degraded performance. For example, a group of service endpoints can be associated with a VIP (virtual IP) for load balancing among the service endpoints. More instances of service endpoints can be added as traffic increases by control plane spawning replica services (e.g., pods). The controller or control plane can add forwarding entries in the packet processing pipeline identifying VIP addresses and destination IP addresses of the added service endpoints. Multiple entries can direct packets of one or more flows to a same backend pod IP address to achieve a weighted load-balancing. Controller can identify a service that is idle or whose load is less than a threshold level and cause the endpoint to be removed. Controller can remove an try or entries in the packet processing pipeline that refer to the removed endpoint.

Figure 6:
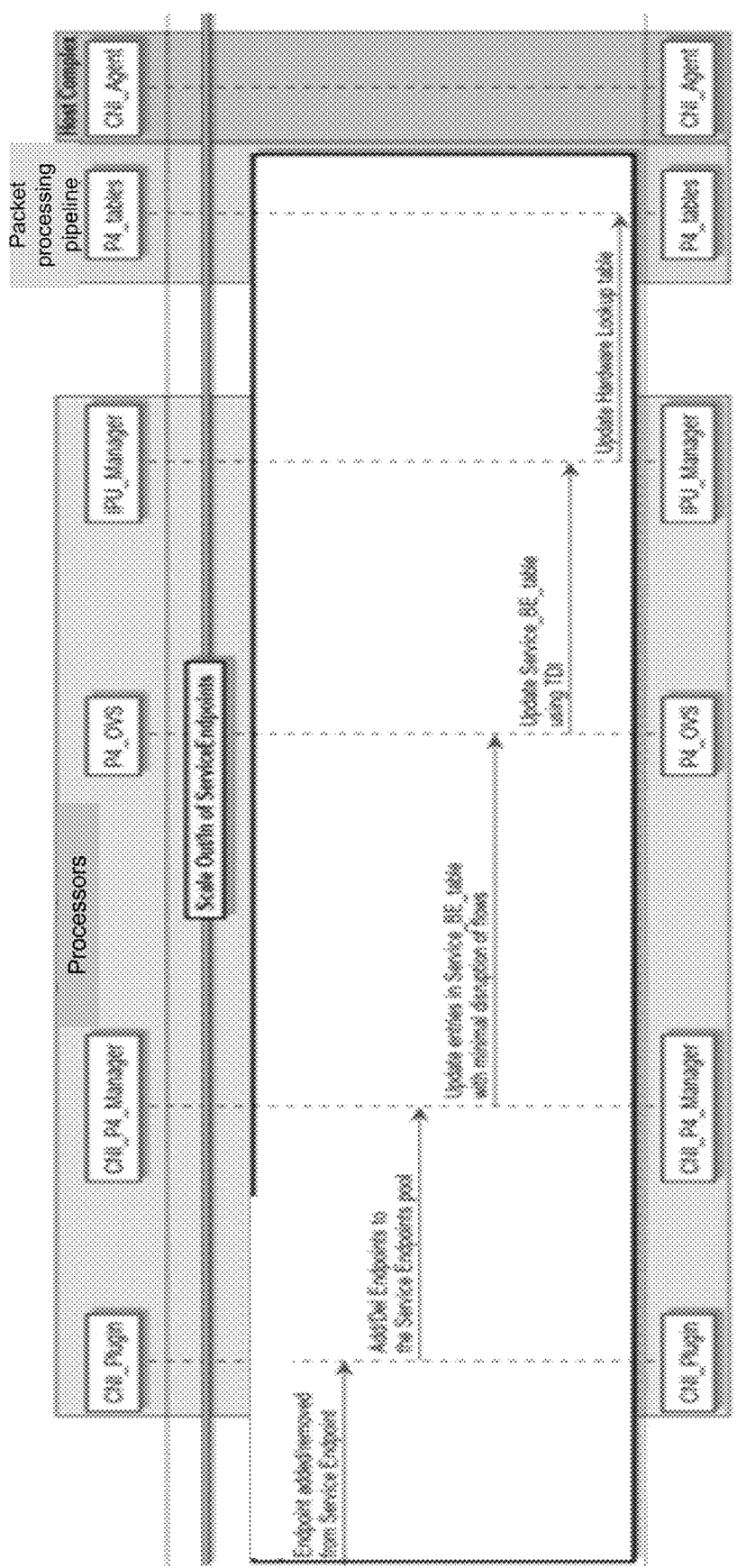
FIG. 6 depicts an example update to add or remove a service endpoint.

FIG. 6 depicts an example update to add or remove a service endpoint. A control plane can issue RuleSet Events to CNI_Plugin to add, delete, or update an entry in a lookup table utilized by a match-action circuitry of a packet processing pipeline. CNI_Plugin can request CNI_P4_Manager to request to add, delete, or update a P4 entry in a packet forwarding lookup table.

CNI_P4_Manager can request P4_OVS to program a network policy table (e.g., P4_tables) with access control lists (ACLs) to a pod interface. An ACL can allow or deny a packet to traverse to or through a packet processing pipeline. P4_OVS can request IPU_Manager to add P4 entries to network policy table based on the ACLs to add, delete, or update an entry related to forwarding operations to a back end service. IPU_Manager can add P4 entries into a lookup table utilized by match-action 202 to implement the request from the control plane to add, delete, or modify forwarding rules.

A controller or control plane can apply security policies to various tiers of a cluster of nodes such as host level firewalling and networking-based rules that are applicable to cluster traffic or applications. A packet processing pipeline can implement security policies based on rulesets or a group of rulesets that apply to packets received from a network or packets to be transmitted to a service or pod. For example, a Network/Cluster Policy for ingress or egress from a packet processing pipeline can refer to {Priority, Pod Source IP Addresses/Classless Inter-Domain Routings (CIDRs), Pod Destination IP Addresses/CIDRs, destination Port/Port Range, Protocol} and have an associated action of allow or deny. A host endpoint policy can be applied at ingress or egress) and can refer to {Priority, Host IP/CIDR, Port/Port Range, Protocol} and have an associated action of forward or deny entry or exit.

FIG. 7 depicts an example of adding, updating, or removing rules to implement a security policy. A control plane can issue RuleSet Events to CNI_Plugin to add, delete, or update an entry in a lookup table utilized by a match-action circuitry of a packet processing pipeline. For example, Kubewatch can be responsible for monitoring for any new applied policy Custom Resource Definitions (CRDs). As a result of detecting a new applied CRD, an event notification is sent to the CNI_Plugin. The control plane IPU Manager can interpret these rules based on event type of Add/Update/Remove, convert them into appropriate pipeline actions to implement the CRD. CNI_Plugin can request CNI_P4_Manager to request to add, delete, or update a P4 entry in a packet forwarding lookup table. CNI_P4_Manager can request P4_OVS to program a network policy table (e.g., P4_tables) with ACLs to a pod interface. P4_OVS can request IPU_Manager to add P4 entries to network policy table based on the ACLS to add, delete, or update an entry related to forwarding operations to a back end service. IPU_Manager can add P4 entries into a lookup table utilized by match-action 202 to implement the request from the control plane to add, delete, or modify forwarding rules in accordance with security policies.

Although examples are described with respect to Protocol-independent Packet Processors (P4) programming language, other languages can be used, including, but not limited to, Protocol-independent Packet Processors (P4), Software for Open Networking in the Cloud (SONiC), Broadcom® Network Programming Language (NPL), NVIDIA® CUDA®, NVIDIA® DOCA™, Data Plane Development Kit (DPDK), OpenDataPlane (ODP), Infrastructure Programmer Development Kit (IPDK), x86 compatible executable binaries or other executable binaries, or others.

FIG. 8 depicts an example process. The process can be performed by a packet processing pipeline to configure the packet processing pipeline to process packets associated with one or more flows. At 802, packet processing pipeline receives configuration of an entry to add to a look-up table. At 804, packet processing pipeline receives a packet that is to be transmitted to another device. At 806, a determination can be made if a match-action entry for the packet is available in the packet processing pipeline. For example, a determination can be made if the first match-action circuitry of the packet processing pipeline identifies a flow of the received packet from a hash value provided with the received packet and a second match-action circuitry of the packet processing pipeline does not identify a flow of the received packet. Based on the match-action entry for the packet being available for application to the packet, the process can proceed to 808. Based on the match-action entry for the packet not being available for application to the packet, the process can proceed to 820.

At 808, the packet can be processed based on the match-action entry associated with a flow of the packet. For example, second match-action circuitry can identify a flow of the packet and perform an action specified in the match-action entry for the packet.

At 820, a match-action entry for a flow of the packet can be retrieved by the first match-action circuitry and metadata associated with the flow of the packet can be updated to include the retrieved a match-action entry and a hash value for the packet and an indication to provide and recirculate the packet to the packet processing pipeline for processing. At 822, the packet processing pipeline can identify that the match-action entry is to be added to the second match-action circuitry for application to packets of the flow. In addition, the action(s) specified in the match-action entry can be performed on the recirculated packet.

FIG. 9 depicts an example network interface device or packet processing device. In some examples, configuration of the packet processing device can be programmed using multiple control planes executing on one or more of processors 904 based on approval of the configuration, as described herein. In some examples, packet processing device 900 can be implemented as a network interface controller, network interface card, a host fabric interface (HFI), or host bus adapter (HBA), and such examples can be interchangeable. Packet processing device 900 can be coupled to one or more servers using a bus, PCIe, CXL, or DDR. Packet processing device 900 may be embodied as part of a system-on-a-chip (SoC) that includes one or more processors, or included on a multichip package that also contains one or more processors.

Some examples of packet processing device 900 are part of an Infrastructure Processing Unit (IPU) or data processing unit (DPU) or utilized by an IPU or DPU. An xPU can refer at least to an IPU, DPU, GPU, GPGPU, or other processing units (e.g., accelerator devices). An IPU or DPU can include a network interface with one or more programmable or fixed function processors to perform offload of operations that could have been performed by a CPU. The IPU or DPU can include one or more memory devices. In some examples, the IPU or DPU can perform virtual switch operations, manage storage transactions (e.g., compression, cryptography, virtualization), and manage operations performed on other IPUs, DPUs, servers, or devices.

Network interface 900 can include transceiver 902, processors 904, transmit queue 906, receive queue 908, memory 910, and bus interface 912, and DMA engine 952. Transceiver 902 can be capable of receiving and transmitting packets in conformance with the applicable protocols such as Ethernet as described in IEEE 802.3, although other protocols may be used. Transceiver 902 can receive and transmit packets from and to a network via a network medium (not depicted). Transceiver 902 can include PHY circuitry 914 and media access control (MAC) circuitry 916. PHY circuitry 914 can include encoding and decoding circuitry (not shown) to encode and decode data packets according to applicable physical layer specifications or standards. MAC circuitry 916 can be configured to assemble data to be transmitted into packets, that include destination and source addresses along with network control information and error detection hash values.

Processors 904 can be any a combination of a: processor, core, graphics processing unit (GPU), field programmable gate array (FPGA), application specific integrated circuit (ASIC), or other programmable hardware device that allow programming of network interface 900. For example, a "smart network interface" can provide packet processing capabilities in the network interface using processors 904.

Processors 904 can include one or more packet processing pipeline that can be configured to perform match-action on received packets to identify packet processing rules and next hops using information stored in a ternary content-addressable memory (TCAM) tables or exact match tables in some embodiments. For example, match-action tables or circuitry can be used whereby a hash of a portion of a packet is used as an index to find an entry. Packet processing pipelines can perform one or more of: packet parsing (parser), exact match-action (e.g., small exact match (SEM) engine or a large exact match (LEM)), wildcard match-action (WCM), longest prefix match block (LPM), a hash block (e.g., receive side scaling (RSS)), a packet modifier (modifier), or traffic manager (e.g., transmit rate metering or shaping). For example, packet processing pipelines can implement access control list (ACL) or packet drops due to queue overflow.

Configuration of operation of processors 904, including its data plane, can be programmed based on one or more of: one or more of: Protocol-independent Packet Processors (P4), Software for Open Networking in the Cloud (SONiC), Broadcom® Network Programming Language (NPL), NVIDIA® CUDA®, NVIDIA® DOCA™, Data Plane Development Kit (DPDK), OpenDataPlane (ODP), Infrastructure Programmer Development Kit (IPDK), x86 compatible executable binaries or other executable binaries, or others. Processors 904 and/or system on chip 950 can execute instructions to configure and utilize one or more circuitry as well as check against violation against use configurations, as described herein.

Packet allocator 924 can provide distribution of received packets for processing by multiple CPUs or cores using timeslot allocation described herein or RSS. When packet allocator 924 uses RSS, packet allocator 924 can calculate a hash or make another determination based on contents of a received packet to determine which CPU or core is to process a packet.

Interrupt coalesce 922 can perform interrupt moderation whereby network interface interrupt coalesce 922 waits for multiple packets to arrive, or for a time-out to expire, before generating an interrupt to host system to process received packet(s). Receive Segment Coalescing (RSC) can be performed by network interface 900 whereby portions of incoming packets are combined into segments of a packet. Network interface 900 provides this coalesced packet to an application.

Direct memory access (DMA) engine 952 can copy a packet header, packet payload, and/or descriptor directly from host memory to the network interface or vice versa, instead of copying the packet to an intermediate buffer at the host and then using another copy operation from the intermediate buffer to the destination buffer.

Memory 910 can be any type of volatile or non-volatile memory device and can store any queue or instructions used to program network interface 900. Transmit queue 906 can include data or references to data for transmission by network interface. Receive queue 908 can include data or references to data that was received by network interface from a network. Descriptor queues 920 can include descriptors that reference data or packets in transmit queue 906 or receive queue 908. Bus interface 912 can provide an interface with host device (not depicted). For example, bus interface 912 can be compatible with PCI, PCI Express, PCI-x, Serial ATA, and/or USB compatible interface (although other interconnection standards may be used).

Figure 10:
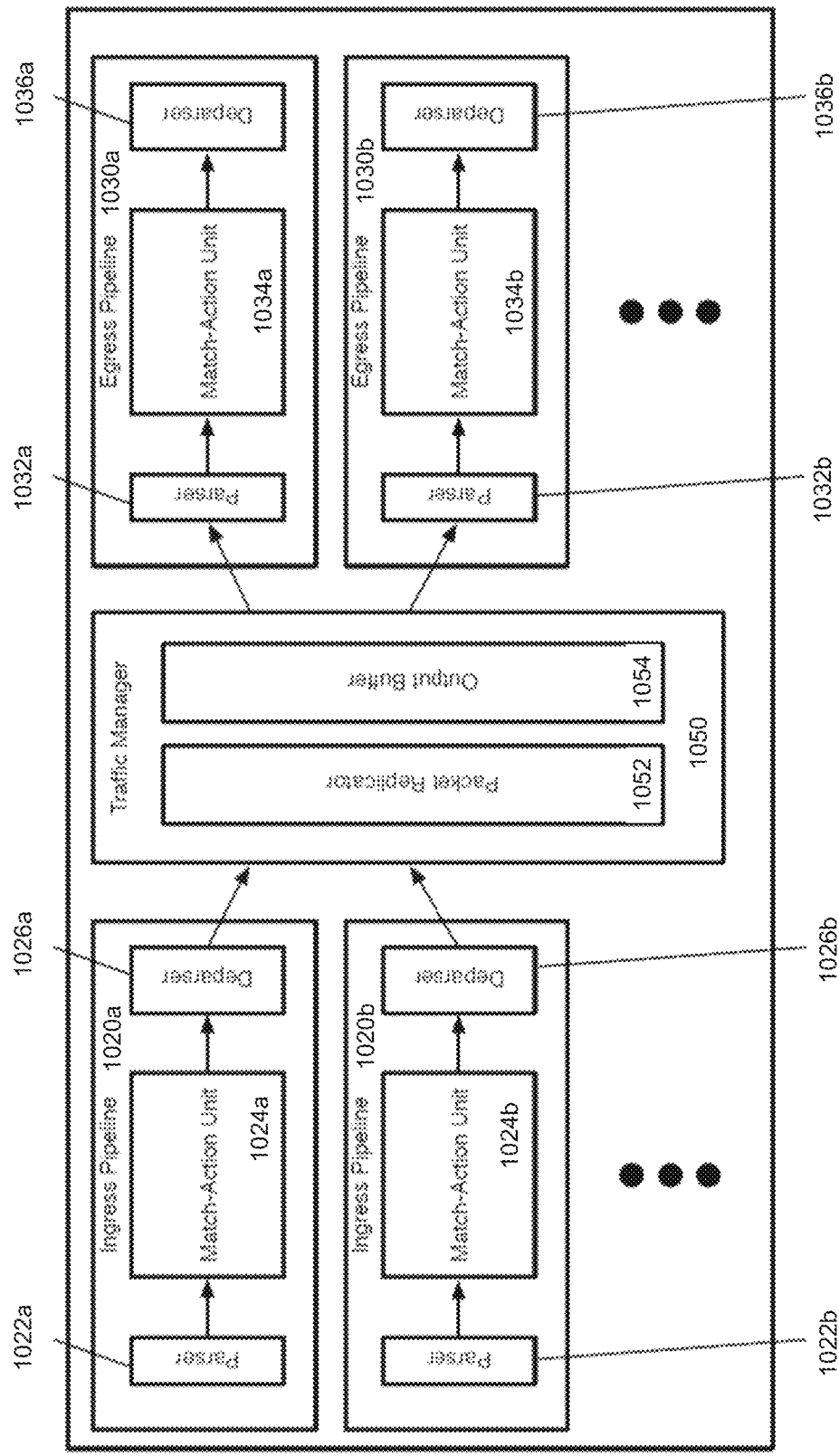
FIG. 10 depicts an example packet processing pipeline.

FIG. 10 depicts an example packet processing pipeline that can be used in a switch, network device, or packet processing device. A packet processing pipeline can be configured by multiple control planes based on approval of a configuration or the configuration can be denied, as described herein. A packet processing pipeline several ingress pipelines 1020, a traffic management unit (referred to as a traffic manager) 1050, and several egress pipelines 1030. Though shown as separate structures, in some examples the ingress pipelines 1020 and the egress pipelines 1030 can use the same circuitry resources. In some examples, the pipeline circuitry is configured to process ingress and/or egress pipeline packets synchronously, as well as non-packet data. That is, a particular stage of the pipeline may process any combination of an ingress packet, an egress packet, and non-packet data in the same clock cycle. However, in other examples, the ingress and egress pipelines are separate circuitry. In some of these other examples, the ingress pipelines also process the non-packet data.

Configuration of the packet processing pipeline by one or more control planes can take place based on approval of the configuration, as described herein. Configuration of operation of packet processing pipelines, including its data plane, can be programmed based on one or more of: Protocol-independent Packet Processors (P4), Software for Open Networking in the Cloud (SONiC), Broadcom® Network Programming Language (NPL), NVIDIA® CUDA®, NVIDIA® DOCA™, Infrastructure Programmer Development Kit (IPDK), among others.

In some examples, in response to receiving a packet, the packet is directed to one of the ingress pipelines 1020 where an ingress pipeline which may correspond to one or more ports of a hardware forwarding element. After passing through the selected ingress pipeline 1020, the packet is sent to the traffic manager 1050, where the packet is enqueued and placed in the output buffer 1054. In some examples, the ingress pipeline 1020 that processes the packet specifies into which queue the packet is to be placed by the traffic manager 1050 (e.g., based on the destination of the packet or a flow identifier of the packet). The traffic manager 1050 then dispatches the packet to the appropriate egress pipeline 1030 where an egress pipeline may correspond to one or more ports of the forwarding element. In some examples, there is no necessary correlation between which of the ingress pipelines 1020 processes a packet and to which of the egress pipelines 1030 the traffic manager 1050 dispatches the packet. That is, a packet might be initially processed by ingress pipeline 1020b after receipt through a first port, and then subsequently by egress pipeline 1030a to be sent out a second port, etc.

A least one ingress pipeline 1020 includes a parser 1022, plural match-action units (MAUs) 1024, and a deparser 1026. Similarly, egress pipeline 1030 can include a parser 1032, plural MAUs 1034, and a deparser 1036. The parser 1022 or 1032, in some examples, receives a packet as a formatted collection of bits in a particular order, and parses the packet into its constituent header fields. In some examples, the parser starts from the beginning of the packet and assigns header fields to fields (e.g., data containers) for processing. In some examples, the parser 1022 or 1032 separates out the packet headers (up to a designated point) from the payload of the packet, and sends the payload (or the entire packet, including the headers and payload) directly to the deparser without passing through the MAU processing.

MAUs 1024 or 1034 can perform processing on the packet data. In some examples, MAUs includes a sequence of stages, with a stage including one or more match tables and an action engine. A match table can include a set of match entries against which the packet header fields are matched (e.g., using hash tables), with the match entries referencing action entries. When the packet matches a particular match entry, that particular match entry references a particular action entry which specifies a set of actions to perform on the packet (e.g., sending the packet to a particular port, modifying one or more packet header field values, dropping the packet, mirroring the packet to a mirror buffer, etc.). The action engine of the stage can perform the actions on the packet, which is then sent to the next stage of the MAU. For example, MAU(s) can be used to determine whether to migrate data to another memory device and select another memory device, as described herein.

Deparser 1026 or 1036 can reconstruct the packet using a packet header vector (PHV) or other metadata as modified by the MAU 1024 or 1034 and the payload received directly from the parser 1022 or 1032. The deparser can construct a packet that can be sent out over the physical network, or to the traffic manager 1050. In some examples, the deparser can construct this packet based on data received along with the PHV that specifies the protocols to include in the packet header, as well as its own stored list of data container locations for possible protocol's header fields.

Traffic manager 1050 can include a packet replicator 1052 and output buffer 1054. In some examples, the traffic manager 1050 may include other components, such as a feedback generator for sending signals regarding output port failures, a series of queues and schedulers for these queues, queue state analysis components, as well as additional components. The packet replicator 1052 of some examples performs replication for broadcast/multicast packets, generating multiple packets to be added to the output buffer (e.g., to be distributed to different egress pipelines).

Output buffer 1054 can be part of a queuing and buffering system of the traffic manager in some examples. The traffic manager 1050 can provide a shared buffer that accommodates any queuing delays in the egress pipelines. In some examples, this shared output buffer 1054 can store packet data, while references (e.g., pointers) to that packet data are kept in different queues for egress pipeline 1030. The egress pipelines can request their respective data from the common data buffer using a queuing policy that is control-plane configurable. When a packet data reference reaches the head of its queue and is scheduled for dequeuing, the corresponding packet data can be read out of the output buffer 1054 and into the corresponding egress pipeline 1030. In some examples, packet data may be referenced by multiple pipelines (e.g., for a multicast packet). In this case, the packet data is not removed from this output buffer 1054 until references to the packet data have cleared their respective queues.

Figure 11:
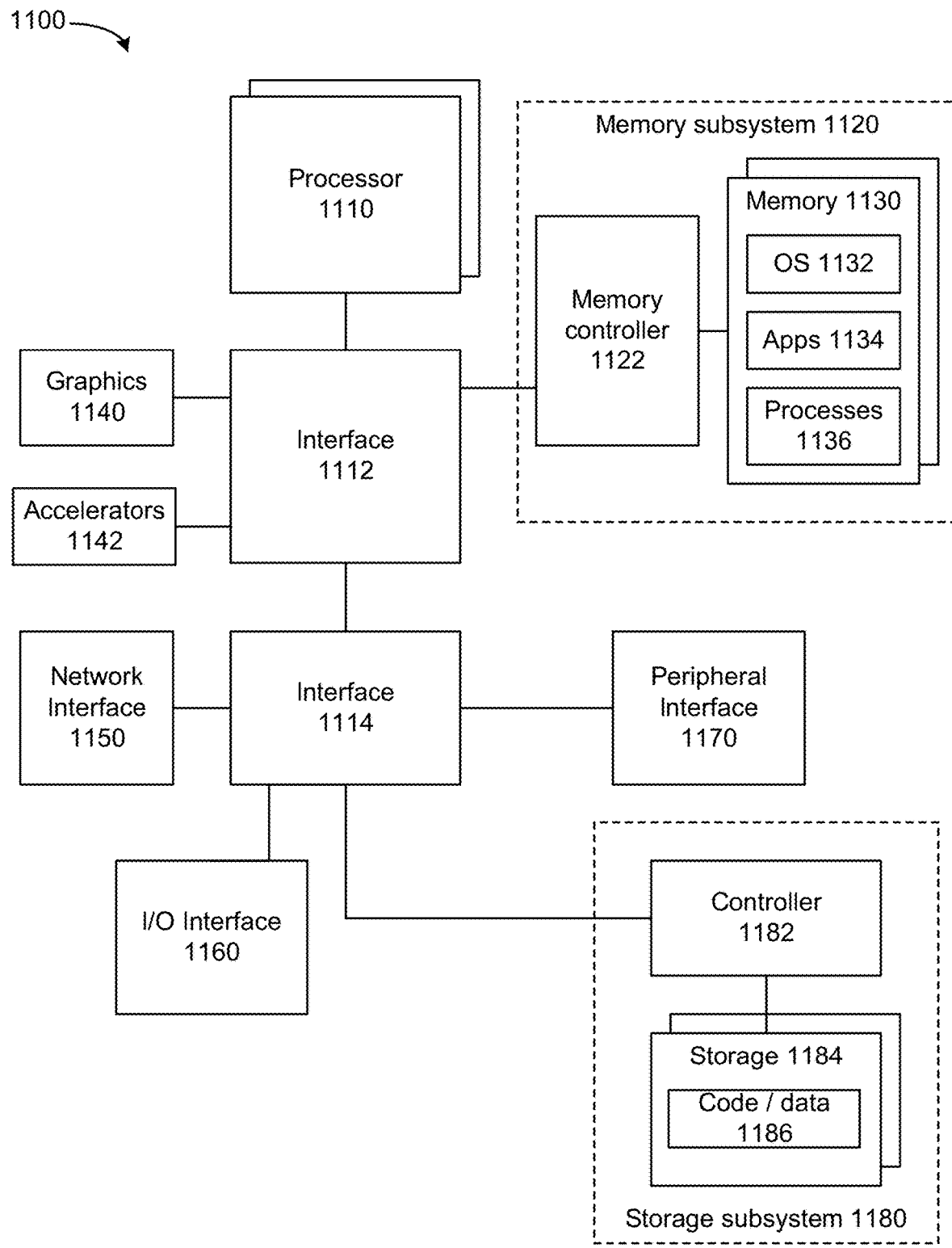
FIG. 11 depicts an example system.

FIG. 11 depicts a system. In some examples, operation of programmable pipelines of network interface 1150 can configured using a recirculated packet, as described herein. System 1100 includes processor 1110, which provides processing, operation management, and execution of instructions for system 1100. Processor 1110 can include any type of microprocessor, central processing unit (CPU), graphics processing unit (GPU), XPU, processing core, or other processing hardware to provide processing for system 1100, or a combination of processors. An XPU can include one or more of: a CPU, a graphics processing unit (GPU), general purpose GPU (GPGPU), and/or other processing units (e.g., accelerators or programmable or fixed function FPGAs). Processor 1110 controls the overall operation of system 1100, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 1100 includes interface 1112 coupled to processor 1110, which can represent a higher speed interface or a high throughput interface for system components that needs higher bandwidth connections, such as memory subsystem 1120 or graphics interface components 1140, or accelerators 1142. Interface 1112 represents an interface circuit, which can be a standalone component or integrated onto a processor die. Where present, graphics interface 1140 interfaces to graphics components for providing a visual display to a user of system 1100. In one example, graphics interface 1140 can drive a display that provides an output to a user. In one example, the display can include a touchscreen display. In one example, graphics interface 1140 generates a display based on data stored in memory 1130 or based on operations executed by processor 1110 or both. In one example, graphics interface 1140 generates a display based on data stored in memory 1130 or based on operations executed by processor 1110 or both.

Accelerators 1142 can be a programmable or fixed function offload engine that can be accessed or used by a processor 1110. For example, an accelerator among accelerators 1142 can provide data compression (DC) capability, cryptography services such as public key encryption (PKE), cipher, hash/authentication capabilities, decryption, or other capabilities or services. In some embodiments, in addition or alternatively, an accelerator among accelerators 1142 provides field select controller capabilities as described herein. In some cases, accelerators 1142 can be integrated into a CPU socket (e.g., a connector to a motherboard or circuit board that includes a CPU and provides an electrical interface with the CPU). For example, accelerators 1142 can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). Accelerators 1142 can provide multiple neural networks, CPUs, processor cores, general purpose graphics processing units, or graphics processing units can be made available for use by artificial intelligence (AI) or machine learning (ML) models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models to perform learning and/or inference operations.

Memory subsystem 1120 represents the main memory of system 1100 and provides storage for code to be executed by processor 1110, or data values to be used in executing a routine. Memory subsystem 1120 can include one or more memory devices 1130 such as read-only memory (ROM), flash memory, one or more varieties of random access memory (RAM) such as DRAM, or other memory devices, or a combination of such devices. Memory 1130 stores and hosts, among other things, operating system (OS) 1132 to provide a software platform for execution of instructions in system 1100. Additionally, applications 1134 can execute on the software platform of OS 1132 from memory 1130. Applications 1134 represent programs that have their own operational logic to perform execution of one or more functions. Processes 1136 represent agents or routines that provide auxiliary functions to OS 1132 or one or more applications 1134 or a combination. OS 1132, applications 1134, and processes 1136 provide software logic to provide functions for system 1100. In one example, memory subsystem 1120 includes memory controller 1122, which is a memory controller to generate and issue commands to memory 1130. It will be understood that memory controller 1122 could be a physical part of processor 1110 or a physical part of interface 1112. For example, memory controller 1122 can be an integrated memory controller, integrated onto a circuit with processor 1110.

Applications 1134 and/or processes 1136 can refer instead or additionally to a virtual machine (VM), container, microservice, processor, or other software. Various examples described herein can perform an application composed of microservices, where a microservice runs in its own process and communicates using protocols (e.g., application program interface (API), a Hypertext Transfer Protocol (HTTP) resource API, message service, remote procedure calls (RPC), or Google RPC (gRPC)). Microservices can communicate with one another using a service mesh and be executed in one or more data centers or edge networks. Microservices can be independently deployed using centralized management of these services. The management system may be written in different programming languages and use different data storage technologies. A microservice can be characterized by one or more of: polyglot programming (e.g., code written in multiple languages to capture additional functionality and efficiency not available in a single language), or lightweight container or virtual machine deployment, and decentralized continuous microservice delivery.

A virtualized execution environment (VEE) can include at least a virtual machine or a container. A virtual machine (VM) can be software that runs an operating system and one or more applications. A VM can be defined by specification, configuration files, virtual disk file, non-volatile random access memory (NVRAM) setting file, and the log file and is backed by the physical resources of a host computing platform. A VM can include an operating system (OS) or application environment that is installed on software, which imitates dedicated hardware. The end user has the same experience on a virtual machine as they would have on dedicated hardware. Specialized software, called a hypervisor, emulates the PC client or server's CPU, memory, hard disk, network and other hardware resources completely, enabling virtual machines to share the resources. The hypervisor can emulate multiple virtual hardware platforms that are isolated from another, allowing virtual machines to run Linux®, Windows® Server, VMware ESXi, and other operating systems on the same underlying physical host. In some examples, an operating system can issue a configuration to a data plane of network interface 1150.

A container can be a software package of applications, configurations and dependencies so the applications run reliably on one computing environment to another. Containers can share an operating system installed on the server platform and run as isolated processes. A container can be a software package that contains everything the software needs to run such as system tools, libraries, and settings. Containers may be isolated from the other software and the operating system itself. The isolated nature of containers provides several benefits. First, the software in a container will run the same in different environments. For example, a container that includes PHP and MySQL can run identically on both a Linux® computer and a Windows® machine. Second, containers provide added security since the software will not affect the host operating system. While an installed application may alter system settings and modify resources, such as the Windows registry, a container can only modify settings within the container.

In some examples, OS 1132 can be Linux®, Windows® Server or personal computer, FreeBSD®, Android®, MacOS®, iOS®, VMware vSphere, openSUSE, RHEL, CentOS, Debian, Ubuntu, or any other operating system. The OS and driver can execute on a processor sold or designed by Intel®, ARM®, AMD®, Qualcomm®, IBM®, Nvidia®, Broadcom®, Texas Instruments®, among others. In some examples, OS 1132 or driver can advertise to one or more applications or processes capability of network interface 1050 to adjust operation of programmable pipelines of network interface 1150 using a recirculated packet. In some examples, OS 1132 or driver can enable or disable network interface 1150 to adjust operation of programmable pipelines of network interface 1150 using a recirculated packet based on a request from an application, process, or other software (e.g., control plane). In some examples, OS 1132 or driver can reduce or limit capabilities of network interface 1050 to adjust operation of programmable pipelines of network interface 1150 using a recirculated packet based on a request from an application, process, or other software (e.g., control plane).

While not specifically illustrated, it will be understood that system 1100 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a Hyper Transport or industry standard architecture (ISA) bus, a small computer system interface (SCSI) bus, a universal serial bus (USB), or an Institute of Electrical and Electronics Engineers (IEEE) standard 1394 bus (Firewire).

In one example, system 1100 includes interface 1114, which can be coupled to interface 1112. In one example, interface 1114 represents an interface circuit, which can include standalone components and integrated circuitry. In one example, multiple user interface components or peripheral components, or both, couple to interface 1114. Network interface 1150 provides system 1100 the ability to communicate with remote devices (e.g., servers or other computing devices) over one or more networks. Network interface 1150 can include an Ethernet adapter, wireless interconnection components, cellular network interconnection components, USB (universal serial bus), or other wired or wireless standards-based or proprietary interfaces. Network interface 1150 can transmit data to a device that is in the same data center or rack or a remote device, which can include sending data stored in memory. Network interface 1150 can receive data from a remote device, which can include storing received data into memory. In some examples, network interface 1150 or network interface device 1150 can refer to one or more of: a network interface controller (NIC), a remote direct memory access (RDMA)-enabled NIC, SmartNIC, router, switch (e.g., top of rack (ToR) or end of row (EoR)), forwarding element, infrastructure processing unit (IPU), or data processing unit (DPU). An example IPU or DPU is described at least with respect to FIG. 12.

In one example, system 1100 includes one or more input/output (I/O) interface(s) 1160. I/O interface 1160 can include one or more interface components through which a user interacts with system 1100 (e.g., audio, alphanumeric, tactile/touch, or other interfacing). Peripheral interface 1170 can include any hardware interface not specifically mentioned above. Peripherals refer generally to devices that connect dependently to system 1100. A dependent connection is one where system 1100 provides the software platform or hardware platform or both on which operation executes, and with which a user interacts.

In one example, system 1100 includes storage subsystem 1180 to store data in a nonvolatile manner. In one example, in certain system implementations, at least certain components of storage 1180 can overlap with components of memory subsystem 1120. Storage subsystem 1180 includes storage device(s) 1184, which can be or include any conventional medium for storing large amounts of data in a nonvolatile manner, such as one or more magnetic, solid state, or optical based disks, or a combination. Storage 1184 holds code or instructions and data 1186 in a persistent state (e.g., the value is retained despite interruption of power to system 1100). Storage 1184 can be generically considered to be a "memory," although memory 1130 is typically the executing or operating memory to provide instructions to processor 1110. Whereas storage 1184 is nonvolatile, memory 1130 can include volatile memory (e.g., the value or state of the data is indeterminate if power is interrupted to system 1100). In one example, storage subsystem 1180 includes controller 1182 to interface with storage 1184. In one example controller 1182 is a physical part of interface 1114 or processor 1110 or can include circuits or logic in both processor 1110 and interface 1114.

A volatile memory is memory whose state (and therefore the data stored in it) is indeterminate if power is interrupted to the device. A non-volatile memory (NVM) device is a memory whose state is determinate even if power is interrupted to the device.

A power source (not depicted) provides power to the components of system 1100. More specifically, power source typically interfaces to one or multiple power supplies in system 1100 to provide power to the components of system 1100. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

In an example, system 1100 can be implemented using interconnected compute sleds of processors, memories, storages, network interfaces, and other components. High speed interconnects can be used such as: Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (RoCE), Peripheral Component Interconnect express (PCIe), Intel QuickPath Interconnect (QPI), Intel Ultra Path Interconnect (UPI), Intel On-Chip System Fabric (IOSF), Omni-Path, Compute Express Link (CXL), HyperTransport, high-speed fabric, NVLink, Advanced Microcontroller Bus Architecture (AMBA) interconnect, OpenCAPI, Gen-Z, Infinity Fabric (IF), Cache Coherent Interconnect for Accelerators (CCIX), 3GPP Long Term Evolution (LTE) (4G), 3GPP 5G, and variations thereof. Data can be copied or stored to virtualized storage nodes or accessed using a protocol such as NVMe over Fabrics (NVMe-oF) or NVMe (e.g., a non-volatile memory express (NVMe) device can operate in a manner consistent with the Non-Volatile Memory Express (NVMe) Specification, revision 1.3c, published on May 24, 2018 ("NVMe specification") or derivatives or variations thereof).

Communications between devices can take place using a network that provides die-to-die communications; chip-to-chip communications; circuit board-to-circuit board communications; and/or package-to-package communications. A die-to-die communications can utilize Embedded Multi-Die Interconnect Bridge (EMIB) or an interposer.

In an example, system 1100 can be implemented using interconnected compute sleds of processors, memories, storages, network interfaces, and other components. High speed interconnects can be used such as PCIe, Ethernet, or optical interconnects (or a combination thereof).

Embodiments herein may be implemented in various types of computing and networking equipment, such as switches, routers, racks, and blade servers such as those employed in a data center and/or server farm environment. The servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities may typically employ large data centers with a multitude of servers. A blade comprises a separate computing platform that is configured to perform server-type functions, that is, a "server on a card." Accordingly, a blade includes components common to conventional servers, including a main printed circuit board (main board) providing internal wiring (e.g., buses) for coupling appropriate integrated circuits (ICs) and other components mounted to the board.

Figure 12:
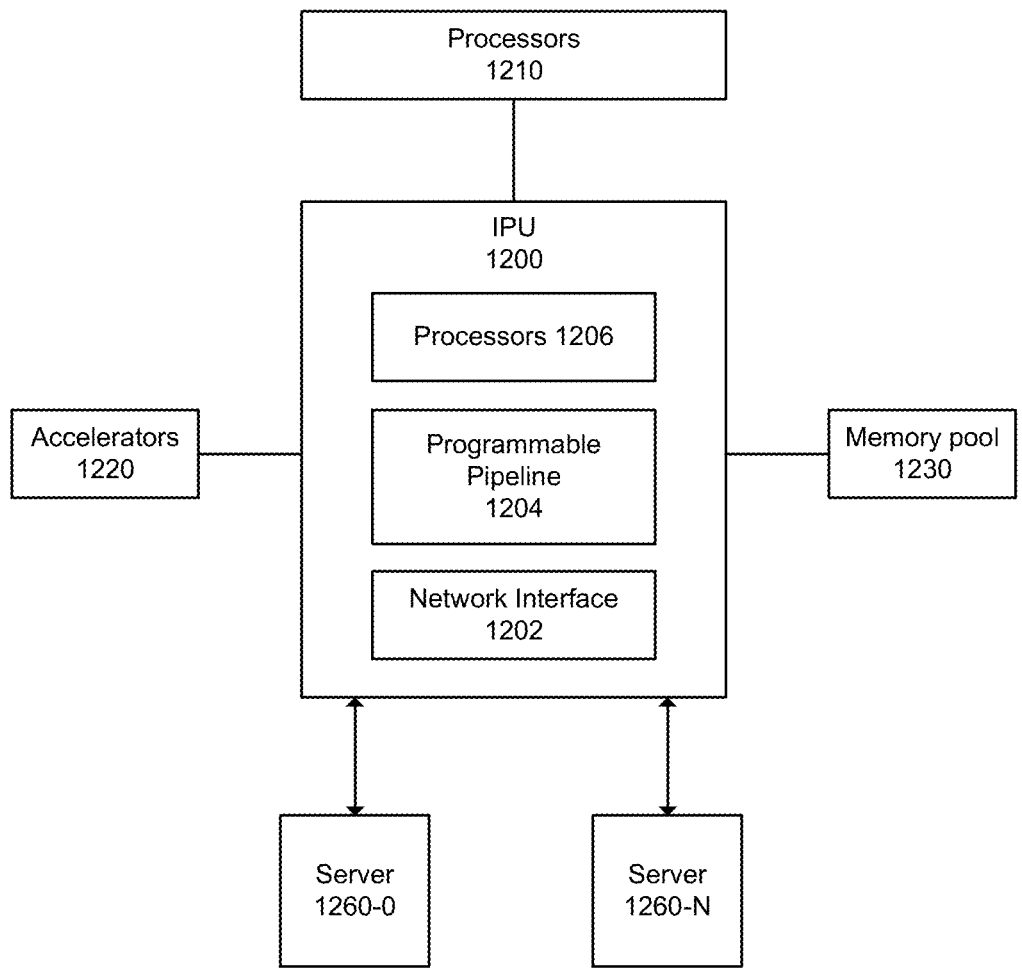
FIG. 12 depicts an example system.

FIG. 12 depicts an example system. In this system, IPU 1200 manages performance of one or more processes using one or more of processors 1206, processors 1210, accelerators 1220, memory pool 1230, or servers 1240-0 to 1240-N, where N is an integer of 1 or more. In some examples, processors 1206 of IPU 1200 can execute one or more processes, applications, VMs, containers, microservices, and so forth that request performance of workloads by one or more of: processors 1210, accelerators 1220, memory pool 1230, and/or servers 1240-0 to 1240-N. IPU 1200 can utilize network interface 1202 or one or more device interfaces to communicate with processors 1210, accelerators 1220, memory pool 1230, and/or servers 1240-0 to 1240-N. IPU 1200 can utilize programmable pipeline 1204 to process packets that are to be transmitted from network interface 1202 or packets received from network interface 1202.

In some examples, devices and software of IPU 1200 can perform capabilities of a router, load balancer, firewall, TCP/reliable transport, service mesh, data-transformation, authentication, security infrastructure services, telemetry measurement, event logging, initiating and managing data flows, data placement, or job scheduling of resources on an XPU, storage, memory, or central processing unit (CPU).

In some examples, devices and software of IPU 1200 can perform operations that include data parallelization tasks, platform and device management, distributed inter-node and intra-node telemetry, tracing, logging and monitoring, quality of service (QoS) enforcement, service mesh, data processing including serialization and deserialization, transformation including size and format conversion, range validation, access policy enforcement, or distributed inter-node and intra-node security.

In some examples, programmable pipelines 1204 can be programmed using one or more control planes executing on one or more processors (e.g., one or more of processors 1206) based on approval of the configuration or the configuration can be denied, as described herein.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. A processor can be one or more combination of a hardware state machine, digital control logic, central processing unit, or any hardware, firmware and/or software elements.

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission, or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of operations may also be performed according to alternative embodiments. Furthermore, additional operations may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z.'"

Illustrative examples of the devices, systems, and methods disclosed herein are provided below. An embodiment of the devices, systems, and methods may include any one or more, and any combination of, the examples described below.

Example 1 includes one or more examples, and includes an apparatus comprising: a network interface device comprising packet processing circuitry, wherein: the packet processing circuitry is to receive a first packet and based on the first packet being associated with an identifier for which an entry is not present in a look-up table accessible to the packet processing circuitry, the packet processing circuitry is to provide the identifier for the first packet and an action for the identifier of the first packet and cause the first packet to configure a second look-up-table accessible to the packet processing circuitry with the action for the identifier.

Example 2 includes one or more examples, wherein the action comprises a load balancing operation.

Example 3 includes one or more examples, wherein the action comprises a network policy indicating permitted receivers, permitted ports, permitted namespaces, and permitted Internet Protocol (IP) address ranges, a forward of traffic in range of IP subnet or range of port numbers, with other ports being blocked.

Example 4 includes one or more examples, wherein the action is to cause a destination address of the packet to be replaced with an address associated with a target device.

Example 5 includes one or more examples, wherein the action is to forward the first packet and other packets of a same flow as that of the first packet to a Kubernetes pod.

Example 6 includes one or more examples, wherein the packet processing circuitry comprises multiple match-action circuitries programmed based on one or more of: Protocol-independent Packet Processors (P4), Software for Open Networking in the Cloud (SONiC), Broadcom® Network Programming Language (NPL), NVIDIA® CUDA®, NVIDIA® DOCA™, Data Plane Development Kit (DPDK), OpenDataPlane (ODP), or Infrastructure Programmer Development Kit (IPDK).

Example 7 includes one or more examples, wherein the packet processing circuitry is to indicate that the first packet is to be re-circulated using an indicator in metadata associated with the first packet.

Example 8 includes one or more examples, wherein the action is to perform a Kube proxy-based service load-balancing.

Example 9 includes one or more examples, wherein the network interface device comprises one or more of: a network interface controller (NIC), a remote direct memory access (RDMA)-enabled NIC, SmartNIC, router, switch, forwarding element, infrastructure processing unit (IPU), or data processing unit (DPU).

Example 10 includes one or more examples, and includes a server communicatively coupled to the network interface device to provide the action for the identifier to the second look-up-table.

Example 11 includes one or more examples, and includes a computer-readable medium comprising instructions stored thereon, that if executed by one or more processors, cause the one or more processors to: based on a command received in an application program interface (API), enable a data plane circuitry of a network interface device to: receive a first packet and based on the first packet being associated with an identifier for which an entry is not present in a look-up table accessed by the data plane circuitry, provide the identifier for the first packet and an action for the identifier of the first packet, and cause the first packet to be re-circulated to configure a second look-up-table accessible to the packet processing with the action for the identifier.

Example 12 includes one or more examples, wherein the action comprises a load balancing operation.

Example 13 includes one or more examples, wherein the action comprises a network policy indicating permitted receivers, permitted ports, permitted namespaces, and permitted Internet Protocol (IP) address ranges, a forward of traffic in range of IP subnet or range of port numbers, with other ports being blocked.

Example 14 includes one or more examples, wherein the action is to cause a destination address of the packet to be replaced with an address associated with a target device.

Example 15 includes one or more examples, wherein the data processing circuitry comprises multiple match-action circuitries programmed based on one or more of: Protocol-independent Packet Processors (P4), Software for Open Networking in the Cloud (SONiC), Broadcom® Network Programming Language (NPL), NVIDIA® CUDA®, NVIDIA® DOCA™, Data Plane Development Kit (DPDK), OpenDataPlane (ODP), or Infrastructure Programmer Development Kit (IPDK).

Example 16 includes one or more examples, wherein the data processing circuitry is to indicate that the first packet is to be re-circulated using an indicator in metadata associated with the first packet.

Example 17 includes one or more examples, and includes a method comprising: a data plane circuitry of a network interface device performing: receiving a first packet and based on the first packet being associated with an identifier for which an entry is not present in a look-up table accessed by the data plane circuitry; providing the identifier for the first packet and an action for the identifier of the first packet; and causing the first packet to be re-circulated to configure a second look-up-table accessible to the packet processing with the action for the identifier.

Example 18 includes one or more examples, wherein the action comprises a load balancing operation.

Example 19 includes one or more examples, wherein the action is to cause a destination address of the packet to be replaced with an address associated with a target device.

Example 20 includes one or more examples, and includes indicating that the first packet is to be re-circulated using an indicator in metadata associated with the first packet.

What is claimed is:

1. An apparatus comprising:
a network interface device comprising packet processing circuitry, a host interface, a direct memory access (DMA) circuitry, and a network interface, wherein:
the packet processing circuitry is to receive a first packet and based on the first packet being associated with an identifier for which an entry is not present in a look-up table accessible to the packet processing circuitry, the packet processing circuitry is to provide the identifier for the first packet and an action for the identifier of the first packet and cause configuration of a second look-up-table accessible to the packet processing circuitry with the action for the identifier.

2. The apparatus of claim 1, wherein the action is to cause performance of a load balancing operation.

3. The apparatus of claim 1, wherein the action is based on one or more of: a network policy indicating permitted receivers, permitted ports, permitted namespaces, permitted Internet Protocol (IP) address ranges, and/or a forward of traffic in range of IP subnet or range of port numbers.

4. The apparatus of claim 1, wherein the action is to cause a destination address of the first packet to be replaced with an address associated with a target device.

5. The apparatus of claim 1, wherein the action is to cause the first packet to be forwarded and other packets of a same flow as that of the first packet to a Kubernetes pod.

6. The apparatus of claim 1, wherein the packet processing circuitry comprises multiple match-action circuitries programmed based on one or more of: Protocol-independent Packet Processors (P4), Software for Open Networking in the Cloud (SONIC), Broadcom® Network Programming Language (NPL), NVIDIA® CUDA®, NVIDIA® DOCA™, Data Plane Development Kit (DPDK), OpenDataPlane (ODP), or Infrastructure Programmer Development Kit (IPDK).

7. The apparatus of claim 1, wherein the packet processing circuitry is to indicate that the first packet is to be re-circulated using an indicator in metadata associated with the first packet.

8. The apparatus of claim 1, wherein the action is to cause performance of a Kube proxy-based service load-balancing.

9. The apparatus of claim 1, wherein the network interface device comprises one or more of: a network interface controller (NIC), a remote direct memory access (RDMA)-enabled NIC, SmartNIC, router, switch, forwarding element, infrastructure processing unit (IPU), or data processing unit (DPU).

10. The apparatus of claim 1, comprising a server communicatively coupled to the network interface device to provide the action for the identifier to the second look-up-table.

11. At least one non-transitory computer-readable medium comprising instructions stored thereon, that if executed by one or more processors, cause the one or more processors to:
based on a command received in an application program interface (API), enable a data plane circuitry of a network interface device to:
receive a first packet;
based on the first packet being associated with an identifier for which an entry is not present in a look-up table accessed by the data plane circuitry,
provide the identifier for the first packet and an action for the identifier of the first packet, and
cause the first packet to be re-circulated to configure a second look-up-table accessible to the data plane circuitry with the action for the identifier.

12. The computer-readable medium of claim 11, wherein the action is to cause performance of a load balancing operation.

13. The computer-readable medium of claim 11, wherein the action is based on one or more of: a network policy indicating permitted receivers, permitted ports, permitted namespaces, permitted Internet Protocol (IP) address ranges, and/or a forward of traffic in range of IP subnet or range of port numbers.

14. The computer-readable medium of claim 11, wherein the action is to cause a destination address of the first packet to be replaced with an address associated with a target device.

15. The computer-readable medium of claim 11, wherein the data plane circuitry comprises multiple match-action circuitries programmed based on one or more of: Protocol-independent Packet Processors (P4), Software for Open Networking in the Cloud (SONIC), Broadcom® Network Programming Language (NPL), NVIDIA® CUDA®, NVIDIA® DOCA™, Data Plane Development Kit (DPDK), OpenDataPlane (ODP), or Infrastructure Programmer Development Kit (IPDK).

16. The computer-readable medium of claim 11, wherein the data plane circuitry is to indicate that the first packet is to be re-circulated using an indicator in metadata associated with the first packet.

17. A method comprising:
a data plane circuitry of a network interface device performing:
receiving a first packet and based on the first packet being associated with an identifier for which an entry is not present in a look-up table accessed by the data plane circuitry;
providing the identifier for the first packet and an action for the identifier of the first packet; and
causing the first packet to be re-circulated to configure a second look-up-table accessible to the data plane circuitry with the action for the identifier.

18. The method of claim 17, wherein the action is based on one or more of: a network policy indicating permitted receivers, permitted ports, permitted namespaces, permitted Internet Protocol (IP) address ranges, or a forward of traffic in range of IP subnet or range of port numbers.

19. The method of claim 17, wherein the method causes a destination address of the first packet to be replaced with an address associated with a target device.

20. The method of claim 17, comprising:
indicating that the first packet is to be re-circulated using an indicator in metadata associated with the first packet.

* * * * *

UNITED STATES PATENT AND TRADEMARK OFFICE
CERTIFICATE OF CORRECTION

| | |
|---|---|
| PATENT NO. | : 12,489,710 B2 |
| APPLICATION NO. | : 17/958349 |
| DATED | : December 2, 2025 |
| INVENTOR(S) | : Anjali Singhai Jain et al. |

It is certified that error appears in the above-identified patent and that said Letters Patent is hereby corrected as shown below:

In the Claims

Claim 6: "Software for Open Networking in the Cloud (SONIC)" should read Software for Open Networking in the Cloud (SONiC)

Claim 15: "Software for Open Networking in the Cloud (SONIC)" should read Software for Open Networking in the Cloud (SONiC)

Signed and Sealed this
Thirtieth Day of December, 2025

John A. Squires
*Director of the United States Patent and Trademark Office*